US012646450B2

(12) United States Patent
Li et al.

(10) Patent No.: US 12,646,450 B2
(45) **Date of Patent: *Jun. 2, 2026**

(54) ELECTRONIC DEVICE AND DISPLAY DRIVING METHOD

(71) Applicants: BOE MLED Technology Co., Ltd., Beijing (CN); BOE Technology Group Co., Ltd., Beijing (CN)

(72) Inventors: Xiuling Li, Beijing (CN); Qibing Gu, Beijing (CN); Guofeng Hu, Beijing (CN); Bao Fu, Beijing (CN); Wenchieh Huang, Beijing (CN); Lingyun Shi, Beijing (CN)

(73) Assignees: BOE MLED Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/008,230

(22) Filed: Jan. 2, 2025

(65) Prior Publication Data

US 2025/0232712 A1 Jul. 17, 2025

Related U.S. Application Data

(63) Continuation of application No. 18/044,311, filed as application No. PCT/CN2022/088732 on Apr. 24, 2022, now Pat. No. 12,230,189.

(51) Int. Cl.
*G09G 3/32* (2016.01)

(52) U.S. Cl.
CPC ....... *G09G 3/32* (2013.01); *G09G 2310/0275* (2013.01); *G09G 2310/08* (2013.01); *G09G 2330/021* (2013.01)

(58) Field of Classification Search
CPC ............ G09G 3/32; G09G 2310/0275; G09G 2310/08; G09G 2330/021
See application file for complete search history.

(56) References Cited

U.S. PATENT DOCUMENTS 11,587,506 B2 * 2/2023 Liu .......................... G09G 3/32
2003/0052904 A1 * 3/2003 Gu ....................... G09G 3/3216
345/691

(Continued)

FOREIGN PATENT DOCUMENTS

CN 110010057 A 7/2019
CN 211654192 U * 10/2020

(Continued)

OTHER PUBLICATIONS

Chinese Office Action, mailed Nov. 27, 2025, from Chinese patent app. No. 202280000856.1, 16 pages.

(Continued)

*Primary Examiner* — Kenneth Bukowski
(74) *Attorney, Agent, or Firm* — Workman Nydegger

(57) ABSTRACT

Embodiments of the present disclosure provide an electronic device and a display driving method. The electronic device includes a plurality of device groups and a plurality of driving elements; a first terminal of at least one device group among the plurality of device groups is coupled with a positive signal line, a second terminal of at least one device group among the plurality of device groups is coupled with an output terminal of any one of the plurality of driving elements, and a reference voltage terminal of any one of the plurality of driving elements is configured to be coupled with a reference signal line.

20 Claims, 14 Drawing Sheets

(56) References Cited

U.S. PATENT DOCUMENTS

| | | | | |
|---|---|---|---|---|
| 2006/0125737 | A1* | 6/2006 | Kwak | G09G 3/3233 345/76 |
| 2017/0256522 | A1* | 9/2017 | Cok | H01L 25/0753 |
| 2018/0247586 | A1* | 8/2018 | Vahid Far | G09G 3/3216 |
| 2019/0265478 | A1* | 8/2019 | Cok | G02B 27/0172 |
| 2021/0264848 | A1* | 8/2021 | Yamashita | G09G 3/2011 |
| 2022/0139316 | A1* | 5/2022 | Liu | G09G 3/2081 345/214 |
| 2022/0246088 | A1* | 8/2022 | Zhai | G09G 3/32 |
| 2022/0406245 | A1* | 12/2022 | Chen | H10D 86/443 |
| 2023/0326398 | A1* | 10/2023 | Li | G09G 3/2088 345/204 |

FOREIGN PATENT DOCUMENTS

| | | | | |
|---|---|---|---|---|
| CN | 113053301 | A | 6/2021 | |
| CN | 113130463 | A * | 7/2021 | H10H 20/857 |
| CN | 113487997 | A | 10/2021 | |
| JP | 2007206465 | A | 8/2007 | |
| JP | 2011099923 | A | 5/2011 | |
| JP | 2015004841 | A | 1/2015 | |
| KR | 20060056790 | A | 5/2006 | |
| WO | WO-2021195838 | A1 * | 10/2021 | G09G 3/2088 |
| WO | 2022061846 | A1 | 3/2022 | |

OTHER PUBLICATIONS

Korean Office Action, mailed Dec. 16, 2025, from Korean patent app. No. 10-2024-7018252, 15 pages.

Japanese 2nd Office Action, mailed Apr. 7, 2026, from Japanese Patent Application No. 2024-532787, 10 pages.

* cited by examiner

ELECTRONIC DEVICE AND DISPLAY DRIVING METHOD

The present application is a continuation of U.S. patent application Ser. No. 18/044,311, filed on Mar. 7, 2023, which is a National Stage of International Application No. PCT/CN2022/088732, filed on Apr. 24, 2022, both which are hereby incorporated by reference in their entireties.

FIELD

The present disclosure relates to technical field of light emitting, in particular to an electronic device and a display driving method.

BACKGROUND

Light-emitting diode (LED) display refers to a technology that a huge quantity of traditional LEDs are transferred to a circuit substrate after arraying, miniaturizing and then addressing, an ultra-small spacing LED is formed, and a length of a millimeter level LED is further reduced to a micron level to achieve an ultra-high pixel and an ultra-high resolution, which can theoretically adapt to screens of various sizes.

SUMMARY

An electronic device provided by an embodiment of the present disclosure includes: a plurality of device groups and a plurality of driving elements; wherein a first terminal of at least one device group of the plurality of device groups is coupled with a positive signal line, a second terminal of at least one device group of the plurality of device groups is coupled with an output terminal of any one driving element of the plurality of driving elements, and a reference voltage terminal of the driving element of the plurality of driving elements is configured to be coupled with a reference signal line; and the driving element of the plurality of driving elements is configured to control the positive signal line and the reference voltage terminal of the driving element to form an electrical loop within a working time duration of a light-emitting period, and adjust a potential of the second terminal of the at least one device group coupled with the driving element before the working time duration of the light-emitting period.

In some examples, any one of the plurality of driving elements is further configured to control the second terminal of the device group coupled with the driving element to be on with the reference voltage terminal of the driving element for a first compensation time before the working time duration.

In some examples, the driving element of the plurality of driving elements is further configured to control the positive signal line to form the electrical loop at least successively through the device group coupled with the driving element, the output terminal of the driving element and the reference voltage terminal at an end moment of the first compensation time.

In some examples, the driving element of the plurality of driving elements is further configured to control the second terminal of the device group coupled with the driving element to be on with the reference voltage terminal of the driving element for a second compensation time within the working time duration.

In some examples, the first compensation time and the second compensation time are successively-continuous time durations.

In some examples, for the at least one device group of the plurality of device groups, the second compensation time corresponding to the at least one device group is less than the first compensation time corresponding to the at least one device group.

In some examples, for the at least one device group of the plurality of device groups, the second compensation time corresponding to the at least one device group is less than half of the first compensation time corresponding to the at least one device group.

In some examples, the at least one device group includes a plurality of devices; and each device of the plurality of devices is provided with a first compensation time and a second compensation time corresponding to the device, and the second compensation time corresponding to each device of the plurality of devices is less than half of the first compensation time corresponding to each device of the plurality of devices.

In some examples, at least two devices of the plurality of devices respectively correspond to different first compensation times, wherein a first compensation time which is relatively larger among the different first compensation times corresponds to a second compensation time which is relatively larger.

In some examples, second compensation times corresponding to at least part of the plurality of devices are the same.

In some examples, the driving element of the plurality of driving elements is further configured to control the second terminal of the device group coupled with the driving element to be on with the reference voltage terminal of the driving element for a potential compensation time according to the pre-stored potential compensation time corresponding to the device group coupled with the driving element, wherein the potential compensation time is the first compensation time; or the potential compensation time is a sum of the first compensation time and the second compensation time.

In some examples, the driving element of the plurality of driving elements includes a processing control circuit and a data driving circuit; the data driving circuit is coupled with the processing control circuit, the output terminal and the reference voltage terminal respectively; the processing control circuit is configured to generate a light-emitting control signal within the light-emitting period and send the light-emitting control signal to the data driving circuit; and generate a potential adjusting control signal according to the potential compensation time and send the potential adjusting control signal to the data driving circuit; and the data driving circuit is configured to control the positive signal line to form the electrical loop successively through the device group coupled with the driving element, the output terminal of the driving element and the reference voltage terminal according to the received light-emitting control signal within the light-emitting period, and control the second terminal of the corresponding device group to be on with the reference voltage terminal according to an effective level of the received potential adjusting control signal, wherein an effective level duration of the potential adjusting control signal corresponding to the device group is the potential compensation time.

In some examples, the data driving circuit includes at least one data driving sub-circuit; one data driving sub-circuit is coupled with one output terminal; and the data driving sub-circuit is configured to receive the light-emitting control signal and the potential adjusting control signal corresponding to the coupled device group, control the positive signal line to form the electrical loop successively through the device group coupled with the driving element, the output terminal of the driving element and the reference voltage terminal of the driving element in response to the light-emitting control signal, and control the second terminal of the coupled device group to be on with the reference voltage terminal in response to the potential adjusting control signal.

In some examples, the light-emitting control signal includes a driving control signal and a current control signal; the data driving sub-circuit comprises a modulation circuit, a constant current source circuit and a potential adjusting circuit, wherein the constant current source circuit is coupled with the processing control circuit and the modulation circuit respectively, and the modulation circuit is coupled with an corresponding output terminal; the potential adjusting circuit is coupled with the processing control circuit and an corresponding output terminal respectively; the constant current source circuit is configured to receive the current control signal of the corresponding device group and output a current of a constant amplitude corresponding to the current control signal according to the received current control signal; the modulation circuit is configured to receive the driving control signal of the corresponding device group and input a current generated by the constant current source circuit to the coupled output terminal according to the effective level of the received driving control signal, so as to control the positive signal line to form the electrical loop at least successively through the device group coupled with the driving element, the output terminal of the driving element and the reference voltage terminal of the driving element within the working time duration; and the potential adjusting circuit is configured to receive the potential adjusting control signal of the corresponding device group and control the second terminal of the coupled device group to be on with the reference voltage terminal according to the received potential adjusting control signal.

In some examples, the electronic device further includes: a control circuit; the control circuit is coupled with the plurality of driving elements respectively; the control circuit is configured to store the potential compensation time of the device group corresponding to each coupled driving element and send an potential compensation time of an device group corresponding to each driving element to each driving element when the electronic device is started; and each of the driving elements is configured to receive and store the potential compensation time sent by a system circuit when the electronic device is started, and clear the stored potential compensation time when the electronic device is shut down.

In some examples, a driving signal terminal of any one of the plurality of driving elements is configured to be coupled with a driving signal line; the control circuit is further configured to be coupled with the driving signal line and store an address of each coupled driving element, and transmit driving data carrying the address of the driving element to the driving signal line; and each of the driving elements is further configured to receive the driving data and generate the light-emitting control signal according to the driving data when the address, corresponding to the driving element, in the drive data is recognized.

In some examples, an addressing signal terminal of any one of the plurality of driving elements is configured to be coupled with a site selection signal line; the control circuit is further configured to be coupled with the site selection signal line and input a power supply voltage to the site selection signal line; and each of the driving elements is further configured to receive the power supply voltage through the addressing signal terminal.

A display driving method provided by an embodiment of the present disclosure is performed by an electronic device, and the electronic device includes a plurality of device groups and a plurality of driving elements; and the display driving method includes: controlling a positive signal line and a reference voltage terminal to form an electrical loop within a working time duration of one light-emitting period; wherein a potential of a second terminal of a coupled device group is adjusted before the working time duration of the light-emitting period.

DETAILED DESCRIPTION OF THE EMBODIMENTS

Figure 1:
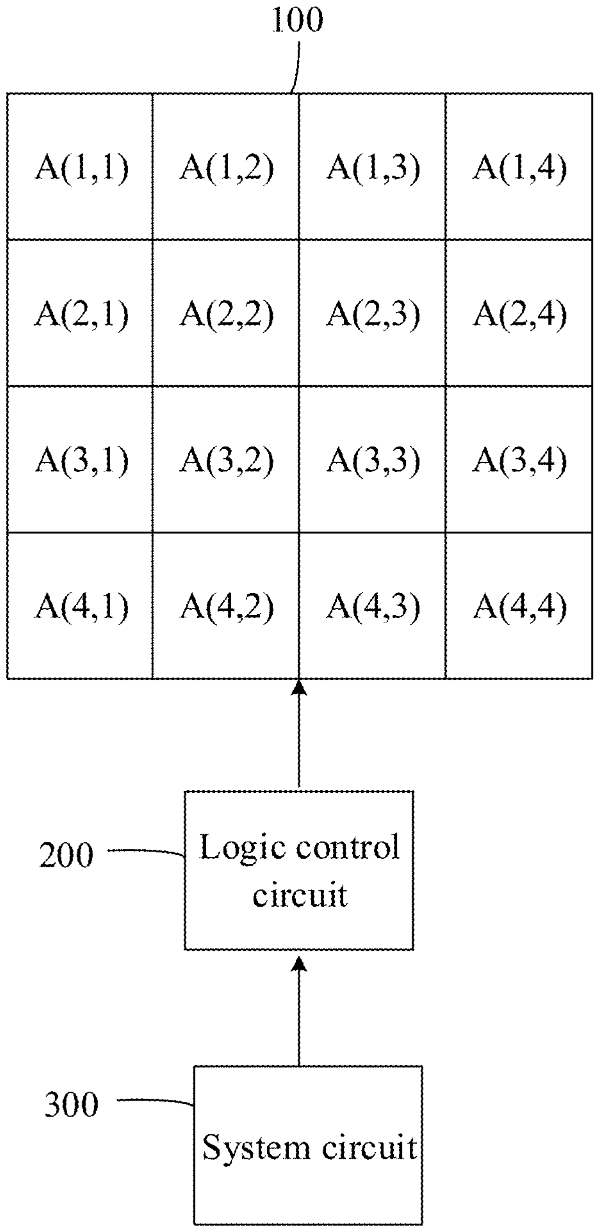
FIG. 1 is a schematic diagram of some structures of an electronic device provided by an embodiment of the present disclosure.

To make objectives, technical solutions and advantages of embodiments of the present disclosure clearer, the technical solutions of the embodiments of the present disclosure will be clearly and completely described below in conjunction with accompanying drawings of the embodiments of the present disclosure. Apparently, the described embodiments are only a part of the embodiments of the present disclosure, not all of the embodiments. The embodiments in the present disclosure and features in the embodiments can be combined with each other in the case of not conflicting. Based on the described embodiments of the present disclosure, all other embodiments obtained by those ordinarily skilled in the art without creative work shall fall within the protection scope of the present disclosure.

Unless otherwise defined, technical or scientific terms used in the present disclosure shall have the ordinary meanings understood by those ordinarily skilled in the art to which the present disclosure pertains. The words “first”, “second” and similar words used in the present disclosure do not indicate any order, quantity or importance, but are merely used to distinguish different components. The words “comprise” or “include” or similar words indicate that an element or item appearing before such the word covers listed elements or items appearing after the word and equivalents thereof, and does not exclude other elements or items. The words “connect” or “couple” or similar words are not limited to physical or mechanical connection, but may include electrical connection, whether direct or indirect.

It needs to be noted that sizes and shapes of all figures in the accompanying drawings do not reflect true scales, and are only intended to schematically illustrate the content of the present disclosure. Same or similar reference numerals represent the same or similar elements or elements with the same or similar functions all the time.

During specific implementation, in an embodiment of the present disclosure, an electronic device may be a display apparatus, and a functional unit is a pixel unit. Exemplarily, the display apparatus may be a mobile phone, a tablet computer, a television, a display, a laptop, a digital photo frame, a navigator and any product or component with a display function. Other essential components of the display apparatus shall be understood by those of ordinary skill in the art, and is omitted herein and also shall not become a restriction to the present disclosure.

As shown in FIG. 1, the electronic device includes a plurality of driving elements arranged in an array, and arranged in M rows and N columns. For example, when N=4 and M=4, the plurality of driving elements may be arranged in 4 rows and 4 columns. According to a physical position of each driving element on a base substrate, the driving elements are marked as: A (1,1), A (1,2), A (1,3), A (1,4), A (2,1), A (2,2), A (2,3), A (2,4), A (3,1), A (3,2), A (3,3), A (3,4), A (4,1), A (4,2), A (4,3), and A (4,4). It should be noted that FIG. 1 only shows possible positions of the driving elements on the base substrate. In practical applications, the quantity of the driving elements (namely specific values of N and M) may be determined according to requirements of the practical applications, which is not limited here.

Figure 2:
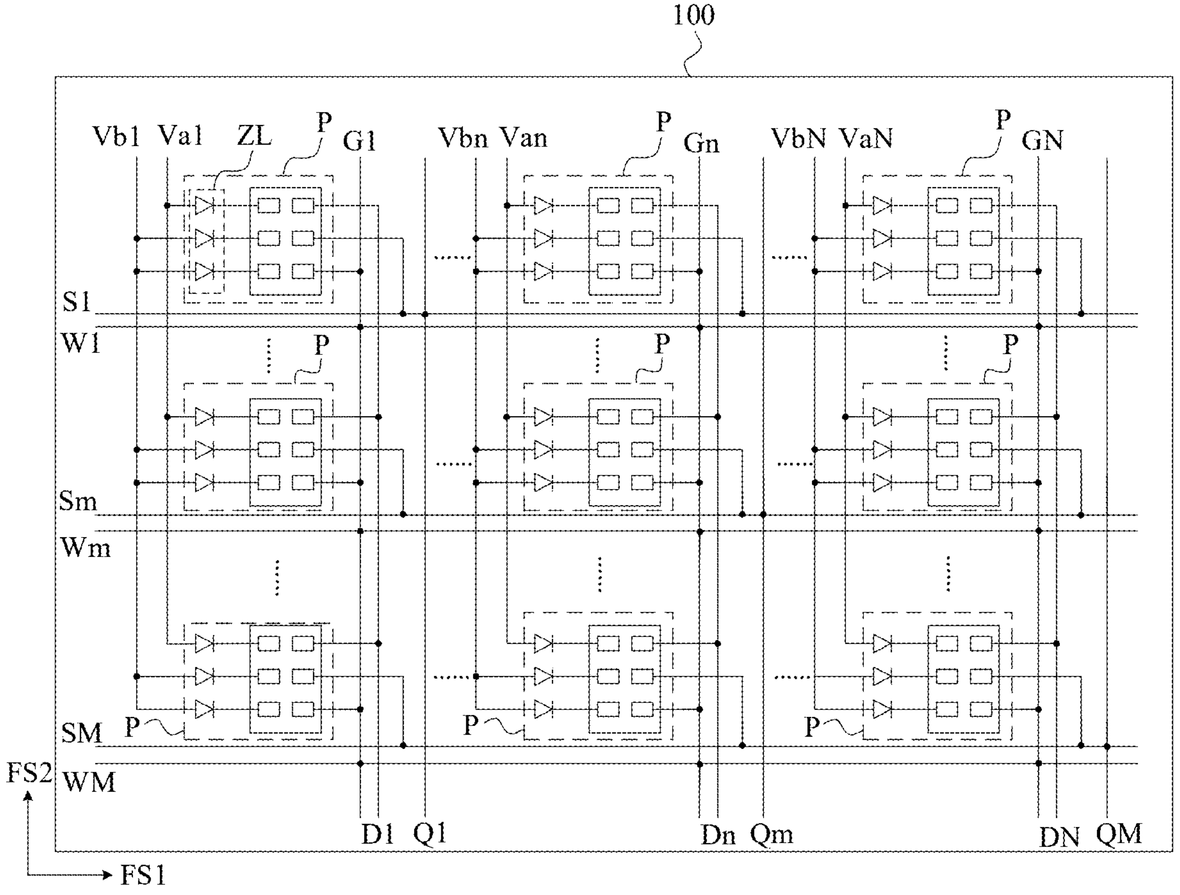
FIG. 2 is a schematic diagram of some structures of a display panel provided by an embodiment of the present disclosure.
Figure 3:
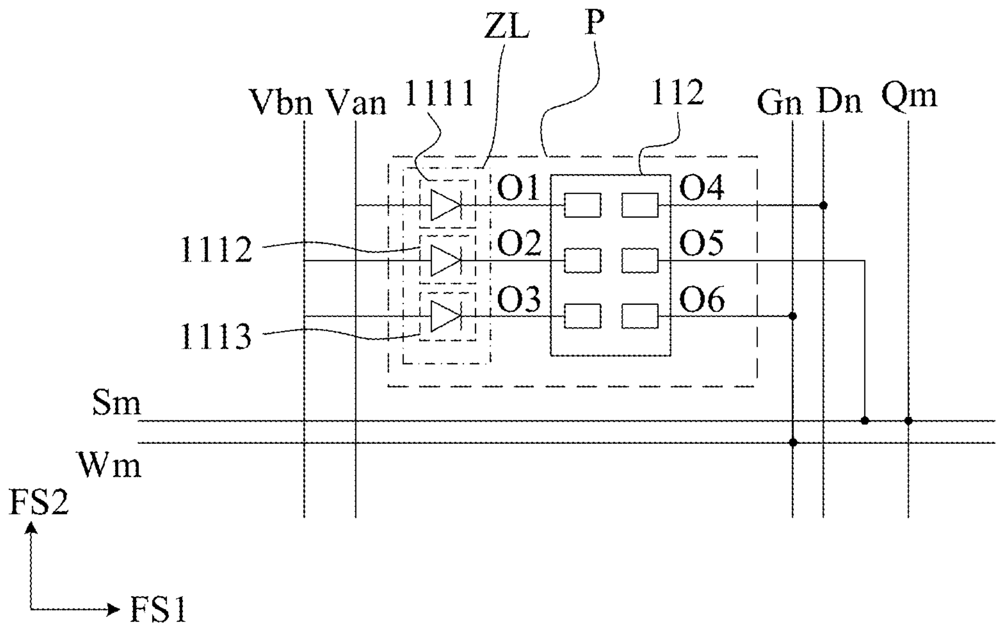
FIG. 3 is a schematic diagram of some partial structures of a display panel provided by an embodiment of the present disclosure.
Figure 4:
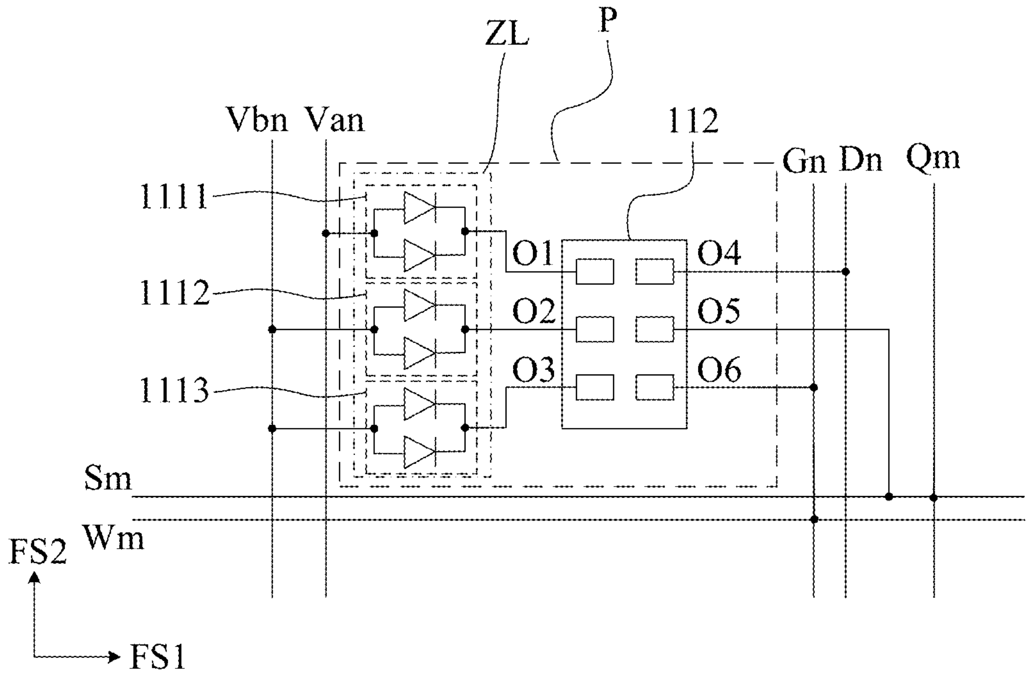
FIG. 4 is a schematic diagram of some other partial structures of a display panel provided by an embodiment of the present disclosure.
Figure 5:
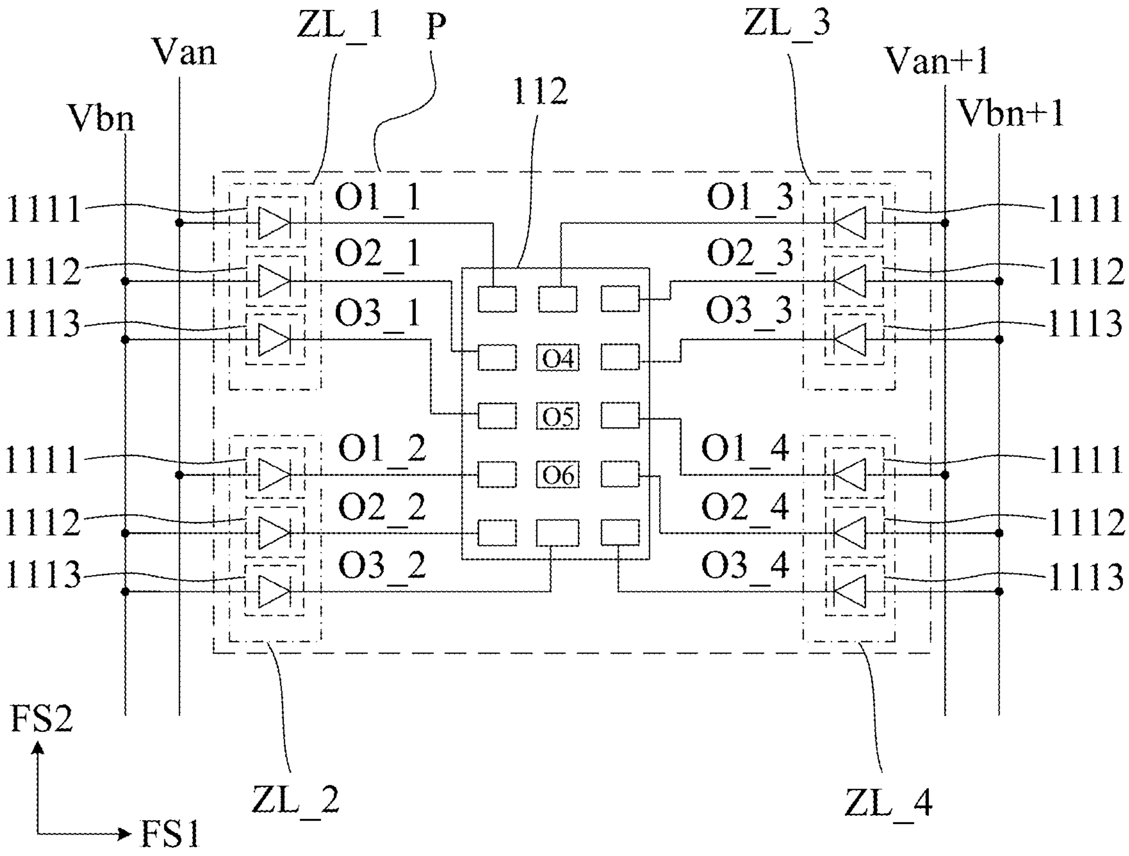
FIG. 5 is a schematic diagram of some yet other partial structures of a display panel provided by an embodiment of the present disclosure.

In some embodiments of the present disclosure, the electronic device further includes a plurality of device groups, a first terminal of one device group may be coupled with a positive signal line, and a second terminal of the device group may be coupled with an output terminal of one driving element 112. As shown in FIG. 2 to FIG. 4, one device group ZL and one driving element 112 form one functional unit P, in addition, in each functional unit P, the first terminal of the device group ZL is coupled with the positive signal line, and the second terminal of the device group ZL is coupled with the output terminal of the driving element 112. As shown in FIG. 5, four device groups ZL_1-ZL_4 and a driving element 112 form one functional unit P, in addition, in each functional unit P, the first terminals of the device groups ZL_1-ZL_4 are coupled with the positive signal line, and the second terminals of the device groups ZL_1-ZL_4 are coupled with different output terminals of the driving element 112 respectively. The present disclosure does not limit the quantity of the device groups in each functional unit.

In some embodiments of the present disclosure, one device group includes at least one device. For example, one device group includes a plurality of devices. Exemplarily, the device may be set as a light emitting device, and then one device group may include at least one light emitting device. Exemplarily, the first terminal of the device group may be a positive electrode of the light emitting device, and the second terminal may be a negative electrode of at least one light emitting device. For example, as shown in FIG. 2 to FIG. 5, each device group may include three light emitting devices (such as 1111-1113). Of course, in practical applications, the functional type and the specific quantity of the devices in the device group may be determined according to the requirements of the practical applications, which are not limited here. A situation that each device group may include three light emitting devices is taken as an example for illustration.

In some embodiments of the present disclosure, one device group ZL includes a plurality of devices. In a case that one driving element controls one device group, the quantity of the output terminals of the driving element 112 may be the same as the quantity of the devices in the device group ZL. Exemplarily, as shown in FIGS. 2 and 3, one device group ZL includes three light emitting devices, then the driving element 112 may have three output terminals, and moreover, one output terminal is coupled with a negative electrode of a light emitting device in one sub-pixel. Of course, it is not limited to this. Exemplarily, as shown in FIG. 4, one device group ZL includes six light emitting devices, but the six light emitting devices are divided into three groups, two light emitting devices in each group are connected in parallel, each group is correspondingly arranged in one sub-pixel one by one, then the driving element 112 may still only have three output terminals, and moreover, one output terminal is coupled with negative electrodes of the two light emitting devices with a parallel connection at the same time.

In some embodiments of the present disclosure, in a case that one driving element controls a plurality of device groups, the quantity of the output terminals of the driving element 112 may be correlated with the quantity of all devices in the plurality of device groups ZL. Exemplarily, as shown in FIG. 5, one driving element controls four device groups ZL_1-ZL_4, each device group includes three light emitting devices, then the driving element 112 has 12 output terminals, and moreover, one output terminal is coupled with a negative electrode of one light emitting device.

In some embodiments of the present disclosure, as shown in FIG. 2, a display panel may further include: a plurality of first positive signal lines Va1 . . . Van . . . VaN ($1 \le n \le N$, and n is an integer), a plurality of second positive signal lines Vb1 . . . Vbn . . . VbN, a plurality of reference signal lines G1 . . . Gn . . . GN, a plurality of site selection signal lines S1 . . . Sm . . . SM ($1 \le m \le M$, and m is an integer), a plurality of site selection signal transfer lines Q1 . . . Qm . . . QM, a plurality of driving signal lines D1 . . . Dn . . . DN and a plurality of auxiliary signal lines W1 . . . Wm . . . WM. Exemplarily, one column of functional units P may correspond to at least one first positive signal line among the plurality of first positive signal lines, at least one second positive signal line among the plurality of second positive signal lines, at least one reference signal line among the plurality of reference signal lines and at least one driving signal line among the plurality of driving signal lines. In addition, one row of functional units may correspond to at least one site selection signal line among the plurality of site selection signal lines, at least one auxiliary signal line among the plurality of auxiliary signal lines and at least one site selection signal transfer line among the plurality of site selection signal transfer lines. For example, one column of the functional units P may correspond to one first positive signal line, one second positive signal line, one reference signal line and one driving signal line. In addition, one row of the functional units P may correspond to one site selection signal line, one auxiliary signal line and one site selection signal transfer line. Optionally, each first positive signal line, each second positive signal line, each reference signal line and each driving signal line may be arranged in a gap between every two adjacent columns of functional units. Each site selection signal line, each auxiliary signal line and each site selection signal transfer line may be arranged in a gap between every two adjacent rows of functional units. Of course, in practical applications, a corresponding mode of the functional units and the above signal lines may be determined according to the requirements of the practical applications, which is not limited here.

In some embodiments of the present disclosure, as shown in FIG. 2, each auxiliary signal line Wm may be coupled with at least one reference signal line Gn, so as to reduce resistance of the reference signal line Gn, reduce a voltage drop of the reference signal line Gn and reduce signal delay on the reference signal line Gn. In addition, all the site selection signal transfer lines Qm may be arranged corresponding to the site selection signal lines Sm one to one. For example, each auxiliary signal line Wm may be coupled with each reference signal line Gn, the site selection signal transfer line Q1 is correspondingly coupled with the site selection signal line S1, the site selection signal transfer line Qm is correspondingly coupled with the site selection signal line Sm, and the site selection signal transfer line QM is correspondingly coupled with the site selection signal line SM.

In some embodiments of the present disclosure, a first positive voltage VLED1 may be transmitted on the first positive signal line Van, a second positive voltage VLED2 may be transmitted on the second positive signal line Vbn, a reference voltage VSS may be transmitted on the reference signal line Gn, a power supply voltage VCC and site selection information may be transmitted on the site selection signal line Sm, and driving data may be transmitted on the driving signal line Dn.

In some embodiments of the present disclosure, as shown in FIG. 2 to FIG. 5, each device group may include three light emitting devices of different colors (such as a first color light emitting device 1111, a second color light emitting device 1112 and a third color light emitting device 1113). The driving element 112 may have output terminals O1-O3, a driving signal terminal O4, an addressing signal terminal O5 and a reference voltage terminal O6. The output terminal O1 is coupled with a negative electrode R− of the first color light emitting device 1111, the output terminal O2 is coupled with a negative electrode G− of the second color light emitting device 1112, the output terminal O3 is coupled with a negative electrode B− of the third color light emitting device 1113, the driving signal terminal O4 is coupled with the driving signal line Dn through a first via hole p1, the addressing signal terminal O5 is coupled with the site selection signal line Sm, the reference voltage terminal O6 is coupled with the reference signal line Gn through a first via hole p2, and the auxiliary signal line Vm is coupled with the reference signal line Gn through a first via hole p5. A positive electrode R+ of the first color light emitting device 1111 is coupled with the first positive signal line Van, a positive electrode G+ of the second color light emitting device 1112 is coupled with the second positive signal line Vbn through a first via hole p4, and a positive electrode B+ of the third color light emitting device 1113 is coupled with the second positive signal line Vbn through the first via hole p4. The site selection signal line Sm is coupled with the site selection signal transfer line Qm through a first via hole p3. It should be noted that in order to clearly highlight a connection relationship of each structure, FIG. 6 only shows the terminals (such as O1-O6) of the driving element 112 and the positive electrodes and negative electrodes of the light emitting devices (such as R+, R−, G+, G−, B+ and B−), and the driving elements 112 and main parts of the light emitting devices are omitted.

In some embodiments of the present disclosure, the first color light emitting device 1111 may be a red light emitting device, the second color light emitting device 1112 may be a green light emitting device, and the third color light emitting device 1113 may be a blue light emitting device. When the red light emitting device, the green light emitting device and the blue light emitting device are driven to emit light of the same brightness, a voltage required to be applied to the positive electrode R+ of the red light emitting device is generally greater than a voltage required to be applied to the positive electrode G+ of the green light emitting device and is generally greater than a voltage required to be applied to the positive electrode B+ of the blue light emitting device. Therefore, if the positive electrodes of the red light emitting device, the green light emitting device and the blue light emitting device are all coupled with the same positive signal line, a voltage that needs to be loaded on the positive signal line is relatively large, which not only increases power consumption, but also makes the voltages loaded on the positive electrodes of the green light emitting device and the blue light emitting device too large, thereby shortening its service life. Therefore, the first positive signal line Van and the second positive signal line Vbn are arranged respectively, the positive electrode R+ of the red light emitting device is coupled with the second positive signal line Vbn, and the positive electrode G+ of the green light emitting device and the positive electrode B+ of the blue light emitting device are coupled with the first positive signal line Van. In practical applications, the second positive voltage VLED2 applied to the second positive signal line Vbn may be higher than the first positive voltage VLED1 applied to the first positive signal line Van, which not only enables the red light emitting device to realize its light-emitting brightness, but also may reduce the power consumption and prolong the service life of the green light emitting device and the blue light emitting device.

In some examples, as shown in FIG. 2, FIG. 3, FIG. 6 and FIG. 7, the display panel may include: a base substrate 010, a buffer layer 011 located on the base substrate 010, a first metal layer 012 located on one side of the buffer layer 011 facing away from the base substrate 010, an insulation layer 013 located on one side of the first metal layer 012 facing away from the base substrate 010, a second metal layer 014 located on one side of the insulation layer 013 facing away from the base substrate 010, a flat layer 015 located on one side of the second metal layer 014 facing away from the base substrate 010, and a passivation layer 016 located on one side of the flat layer 015 facing away from the base substrate 010. In addition, the light emitting devices and the driving elements 112 are arranged on one side of the passivation layer 016 facing away from the base substrate 010.

In some examples, as shown in FIG. 2, FIG. 3, FIG. 6 and FIG. 7, the first metal layer 012 may include a plurality of first positive signal lines Van, a plurality of second positive signal lines Vbn, a plurality of reference signal lines Gn, a plurality of site selection signal transfer lines Qm and a plurality of driving signal lines Dn which are mutually arranged at intervals. Exemplarily, the plurality of first positive signal lines Va1, the plurality of second positive signal lines Vb1, the plurality of reference signal lines Gn, the plurality of site selection signal transfer lines Qm and the plurality of driving signal lines Dn may be arranged in a first direction FS1 and extend in a second direction FS2. Exemplarily, as shown in FIG. 3, the second direction FS2 is perpendicular to the first direction FS1. In practical applications, the second direction FS2 may be a column direction, and the first direction FS1 may be a row direction. Alternatively, the second direction FS2 may be the row direction, and the first direction FS1 may be the column direction.

Figure 6:
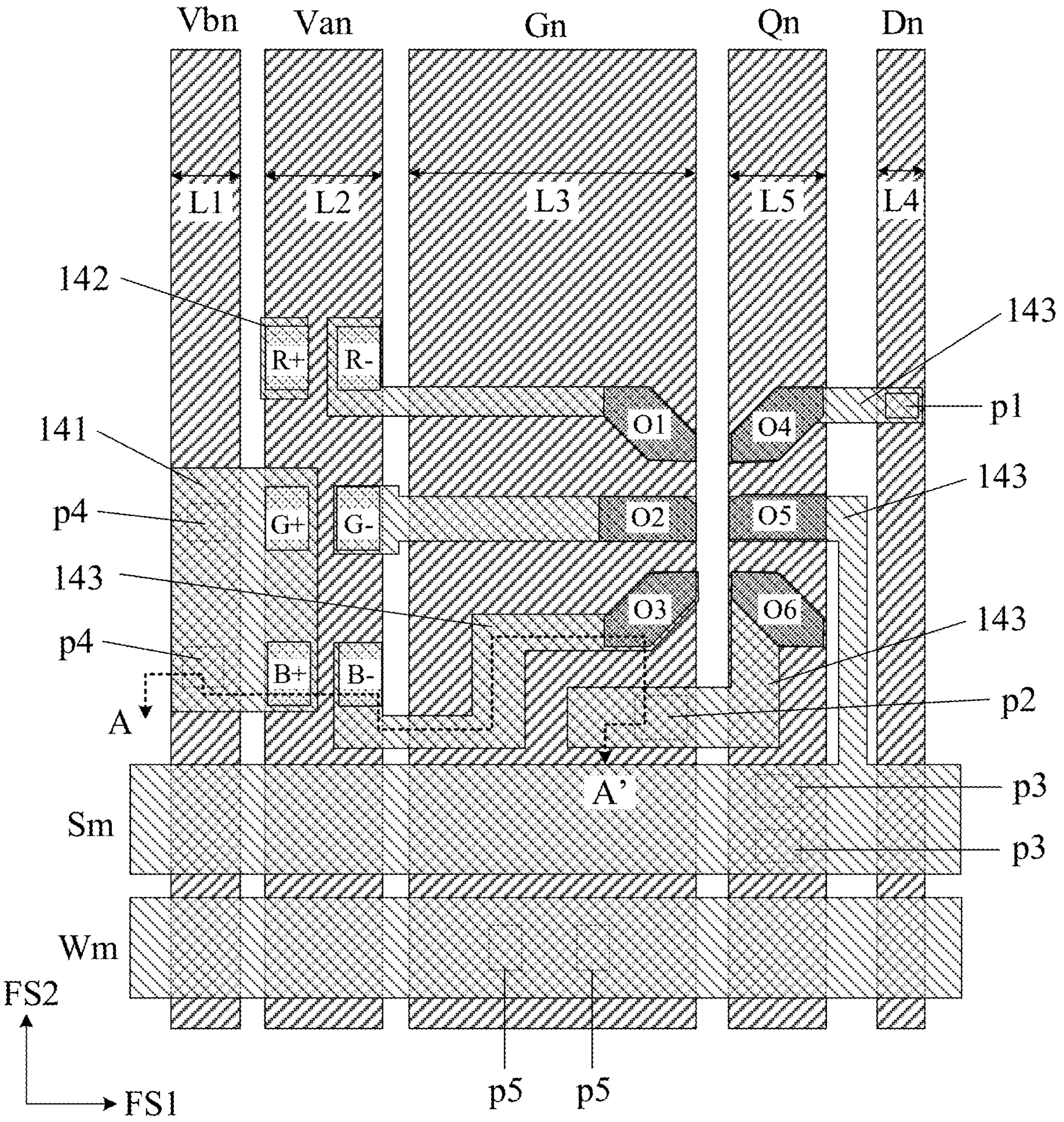
FIG. 6 is a schematic diagram of some layout structures of a display panel provided by an embodiment of the present disclosure.
Figure 7:
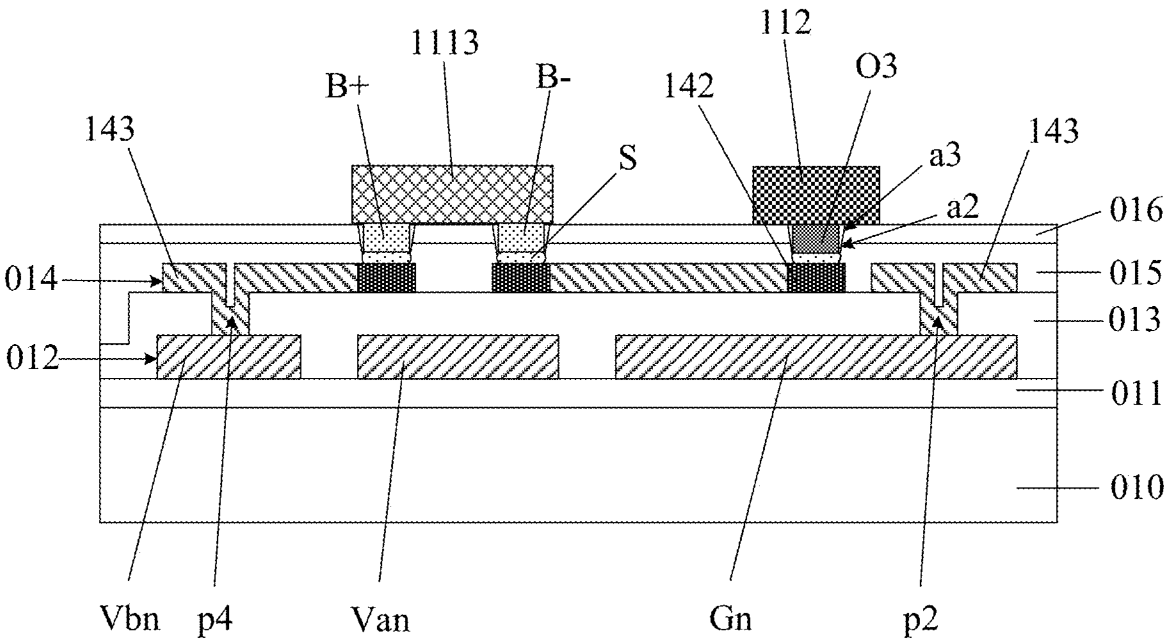
FIG. 7 is a schematic cross-sectional view in a direction AA∝ in the schematic diagram of some layout structures shown in FIG. 6.

Exemplarily, as shown in FIG. 6 and FIG. 7, the second metal layer 014 may include a plurality of first electrodes 144, a plurality of signal connection parts 141, a plurality of connection bonding pads 142 and a plurality of connection wires 143. Exemplarily, the plurality of first electrodes 144, a signal connection part 141, the plurality of connection bonding pads 142 and the plurality of connection wires 143 may be arranged in a functional unit. In addition, the plurality of connection bonding pads 142 may be configured to connect the light emitting devices and the driving elements 112. It should be noted that part of the first electrodes 144 may be coupled with the reference signal line Gn through the first via hole p2, part of the first electrodes 144 may be coupled with the driving signal line Dn through the first via hole p1, and part of the first electrodes 144 may be coupled with the site selection signal line Sm.

In some embodiments, since signals transmitted by the signal lines of different types have different types, the different types of signal lines have different line widths. If the signal lines extend in the first direction FS1, the width of the signal lines refers to the width of the signal lines in a direction perpendicular to its main body extension (such as the second direction FS2). For example, as shown in FIG. 6, a width of the reference signal line Gn is greater than a width of the driving signal line Dn.

Exemplarily, as shown in FIG. 6 and FIG. 7, the flat layer 015 includes a plurality of second via holes a2, and the plurality of second via holes a2 penetrate through the flat layer 015 to expose the second metal layer 014. The passivation layer 016 may include a plurality of third via holes a3, and the plurality of third via holes a3 penetrate to the flat layer 015. A third via hole a3 and a second via hole a2 are corresponding in position, so as to form a penetrating via hole penetrates from the passivation layer 016 to the connection bonding pad 142 of the second metal layer 014. For example, the light emitting devices may be connected with two connection bonding pads 142 through the penetrating via holes penetrating through the flat layer 015 and the passivation layer 016, and the driving elements 112 are connected with six connection bonding pads 142 through the penetrating via holes penetrating through the flat layer 015 and the passivation layer 016, so that the light emitting devices are driven to emit light under the control of the signals transmitted by the signal lines and the driving elements 112.

Exemplarily, as shown in FIG. 6 and FIG. 7, the positive electrodes and the negative electrodes of the light emitting devices and the output terminals to the reference voltage terminals O6 of the driving elements 112 may be coupled with the corresponding connection bonding pads 142 through a welding material S (such as soldering tin, a tin-silver-copper alloy and a tin-copper alloy). For example, the output terminal O3 of the driving element 112 may be coupled with one connection bonding pad 142 through the welding material S, the negative electrode B− of the third color light emitting device 1113 may also be coupled with one connection bonding pad 142 through the welding material S, and the connection bonding pad 142 coupled with the negative electrode B− may be coupled with a connection bonding pad 142 coupled with the reference voltage terminal O6 through the connection wire 143. The positive electrode B+ of the third color light emitting device 1113 may also be coupled with a connection bonding pad 142 through the welding material S, the connection bonding pad 142 coupled with the positive electrode B+ may be coupled with a signal connection part 141, and the signal connection part 141 may be coupled with the first positive signal line Va1 through the first via hole p4. In addition, the reference voltage terminal O6 of the driving element 112 may also be coupled with a connection bonding pad 142 through the welding material S, the connection bonding pad 142 coupled with the reference voltage terminal O6 is coupled with a first electrode 144, and the first electrode 144 may be coupled with the reference signal line Gn through the first via hole p2.

Exemplarily, as shown in FIG. 6 and FIG. 7, each first positive signal line Van is not a signal line with the same width everywhere. In order to facilitate the reasonable layout of the signal lines, the width of the first positive signal line Van is large in some positions and small in some other positions. In some embodiments of the present disclosure, the width of the first positive signal line Van may be an average width of the first positive signal line Van in an extension direction thereof (the first direction FS1), and the average width of the first positive signal line Van in the first direction FS1 refers to a value obtained by weighted summation of the width at each position of the first positive signal line Van. Similarly, the second positive signal line Vbn, the reference signal line Gn, the site selection signal transfer line Qn and the driving signal line Dn all have similar characteristics.

Exemplarily, an average width L3 of the reference signal line Gn may be greater than an average width L2 of the first positive signal line Van, or an average width L1 of the second positive signal line Vbn, or an average width L5 of the site selection signal transfer line Qn, or an average width L4 of the driving signal line Dn, which is not limited here.

In some embodiments of the present disclosure, the light emitting devices may be, for example, mini light emitting diodes (Mini LEDs) or micro light emitting diodes (Micro LEDs). Exemplarily, an orthographic projection of each light emitting device on the base substrate may be a quadrangle, and a value of a size of a long side or wide side of the quadrangle may be in a range of 80 μm to 350 μm. The light emitting devices may be arranged on the base substrate through a surface mounting technology (SMT) or a mass transfer technology.

In some embodiments of the present disclosure, the electronic device may further include: a control circuit, and the control circuit is coupled with each of the plurality of driving elements 112 respectively. As shown in FIG. 1, the control circuit may include a logic control circuit 200 and a system circuit 300. The system circuit 300 receives an initial signal related to a display picture from a television network interface and the like, and performs a series of rendering and decoding processes on the initial signal to generate an image signal and a frame refresh signal FB at the same time, and outputs the image signal to the logic control circuit 200 when a set edge appears in a pulse of the frame refresh signal FB. The logic control circuit 200 receives the image signal from the system circuit 300 and outputs a corresponding driving signal to the driving elements or the device groups through each first positive signal line Va1, each second positive signal line Vb1, each reference signal line Gn, each site selection signal transfer line Qm and the driving signal line Dn in the display panel 100 after further conversion processing.

Figure 8:
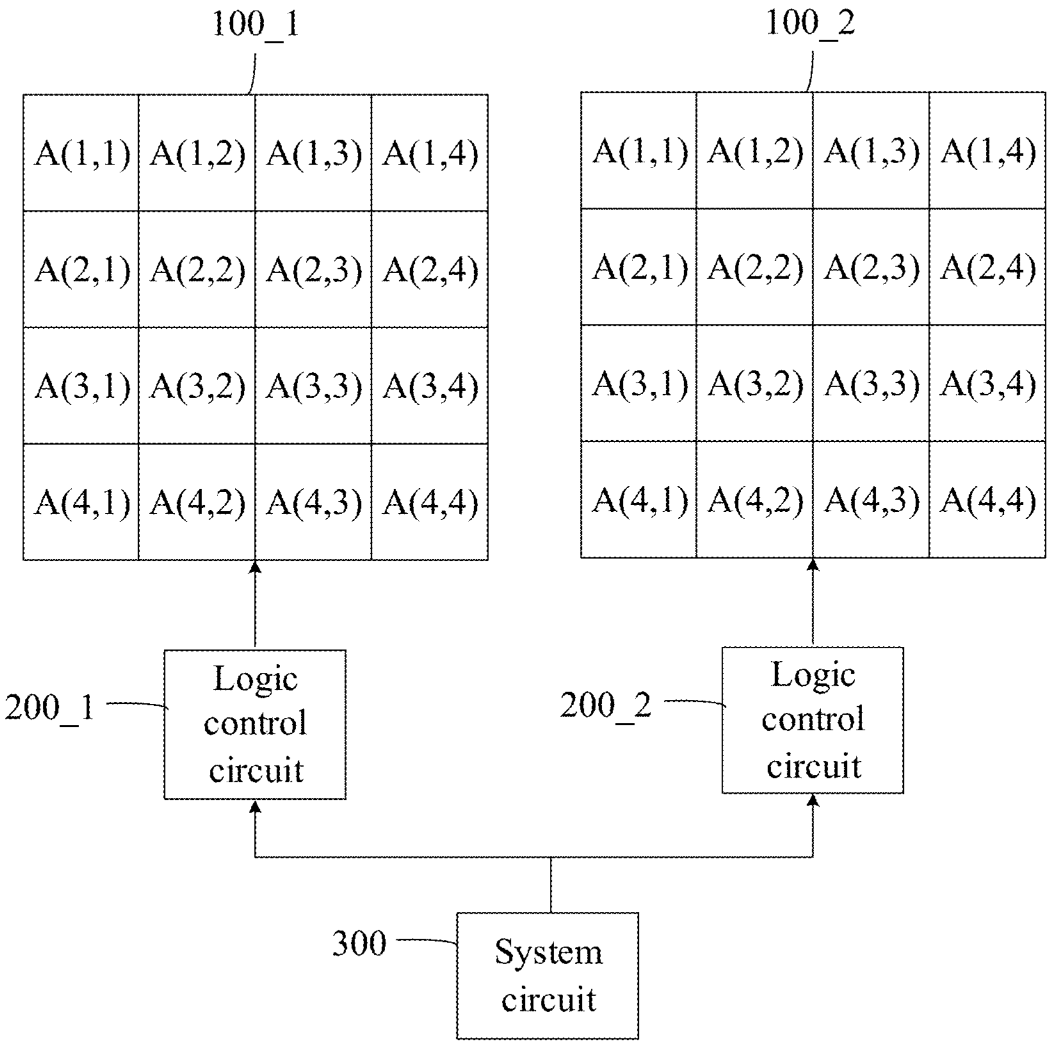
FIG. 8 is a schematic diagram of some other structures of an electronic device provided by an embodiment of the present disclosure.

Exemplarily, as shown in FIG. 8, the electronic device may include a plurality of display panels (such as 100_1 and 100_2) and a plurality of logic control circuits (such as 200_1 and 200_2). One display panel corresponds to one logic control circuit, and all the logic control circuits (such as 200_1 and 200_2) are coupled with one system circuit 300. In this way, a display panel with a larger size may be obtained by splicing the plurality of display panels.

Figure 9:
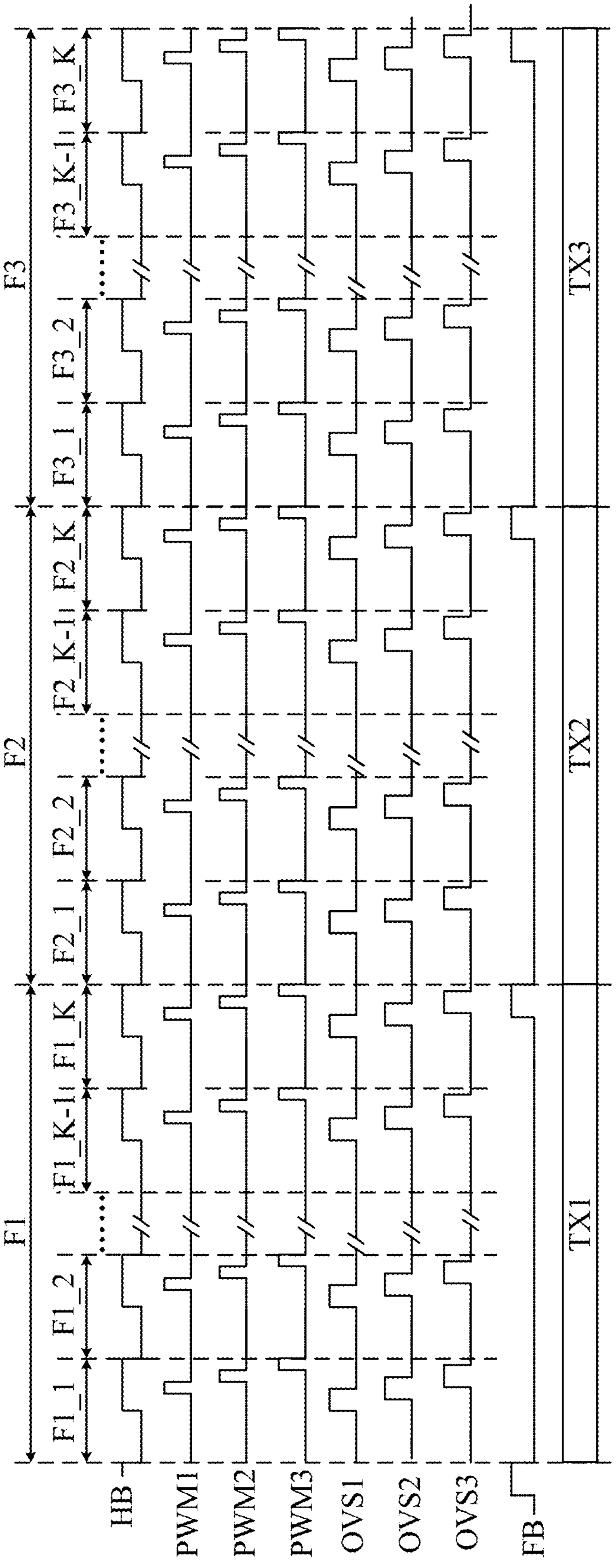
FIG. 9 is a diagram of some signal timings provided by an embodiment of the present disclosure.

In some embodiments of the present disclosure, when the set edge appears in the pulse of the frame refresh signal, the system circuit 300 may send an image signal of a corresponding display frame to the logic control circuit. Exemplarily, the set edge of the frame refresh signal may be a falling edge. Exemplarily, as shown in FIG. 9, FB represents a frame refresh signal, the frame refresh signal FB has a plurality of pulses, and when the falling edge of each pulse appears, an image signal of a next display frame is sent to the logic control circuit. In addition, when the falling edge of each pulse appears, the system circuit 300 outputs the image signal of the corresponding display frame to the logic control circuit. For example, when a falling edge of a first pulse of the frame refresh signal FB appears, the logic control circuit receives an image signal of a display frame F1. When a falling edge of a second pulse of the frame refresh signal FB appears, the logic control circuit receives an image signal of a display frame F2. When a falling edge of a third pulse of the frame refresh signal FB appears, the logic control circuit receives an image signal of a display frame F3. It should be noted that the set edge of the frame refresh signal may also be a rising edge, and its implementation may refer to that of the set edge of the frame refresh signal being the falling edge, which is not repeated here.

In some embodiments of the present disclosure, each display frame further includes a plurality of display subframes, in a display frame, the logic control circuit repeatedly sends the same driving data to the driving elements K times at a first frequency, and the first frequency is a product of a frequency of the frame refresh signal FB and K. A value of K may be 32, 64 and the like, which is not limited here.

In some embodiments of the present disclosure, the logic control circuit stores an address of each driving element coupled with it in advance. In addition, in order to control the synchronous working of each driving element coupled with the logic control circuit as much as possible, the logic control circuit may generate a row synchronous signal in each display frame and output corresponding driving data to the coupled driving elements when a set edge appears in a pulse of the generated row synchronous signal, and a frequency of the row synchronous signal is a first frequency. Exemplarily, in a display frame, the quantity of the set edge of the row synchronous signal may be K. In this way, when the set edge appears in the pulse of the row synchronous signal, the driving data may be sent to the driving elements.

Exemplarily, as shown in FIG. 8 and FIG. 9, the set edge of the row synchronous signal HB is a falling edge, and the set edge of the frame refresh signal FB is a falling edge. The system circuit 300 receives an initial signal related to a to-be-displayed picture of a display frame Fn. For example, the system circuit 300 receives the initial signal related to the to-be-displayed picture of the display frame F1, performs a series of rendering and decoding processing on the initial signal, and then performs splicing according to an address ID_1 corresponding to the logic control circuit 200_1 and an address ID_2 corresponding to the logic control circuit 200_2 which are stored in advance to obtain an image signal TX1 corresponding to the logic control circuit 200_1 and an image signal corresponding to the logic control circuit 200_2 (FIG. 9 takes the image signal TX1 corresponding to the logic control circuit 200_1 as an example, and the image signal corresponding to the logic control circuit 200_2 is not shown). At the same time, the frame refresh signal FB is generated, when the falling edge of the frame refresh signal FB appears, the image signal TX1 corresponding to the logic control circuit 200_1 may be sent to the logic control circuit 200_1, and the image signal corresponding to the logic control circuit 200_2 is sent to the logic control circuit 200_2. The logic control circuit 200_1 is taken as an example, after the logic control circuit 200_1 receives the image signal TX1, the logic control circuit 200_1 generates the driving data corresponding to the coupled driving element 112 according to the image signal TX1, and generates the row synchronous signal HB. When a kth falling edge of the row synchronous signal HB appears (k is a positive integer, and $1 \le k \le K$), the logic control circuit 200_1 may provide the driving data to the driving element 112. Each driving element 112 may drive the coupled light emitting device to emit light after decoding and secondarily processing the part of the driving data corresponding to its corresponding address.

A working process of the logic control circuit 200_2 may refer to a working process of the logic control circuit 200_1, which is not specifically repeated here. It should be noted that the set edge of the row synchronous signal may also be a rising edge, and its implementation may refer to that of the set edge of the row synchronous signal being the falling edge, which is not repeated here.

In some embodiments of the present disclosure, any driving element 112 may control the positive signal line and its reference voltage terminal O6 to form an electrical loop within a working time duration of a light-emitting period. Since the positive signal line is coupled with the first terminal of the light emitting device in the device group, and the reference voltage terminal O6 of the driving element 112 is coupled with the second terminal of the light emitting device in the device group, and when the positive signal line forms the electrical loop at least successively through the coupled device group, the output terminal of the driving element 112 and the reference voltage terminal O6, the light emitting device may be controlled to emit light under the control of current signals with different current amplitudes and/or different duty ratios. Exemplarily, each light-emitting period corresponds to one display sub-frame, and the working time duration is a time duration for forming the above electrical loop. For example, the positive signal line includes a first positive signal line and a second positive signal line, and any driving element 112 may control the first positive signal line to form the electrical loop within the working time duration of each display sub-frame successively through the coupled first color light emitting device 1111, the output terminal of the driving element 112 and the reference voltage terminal O6, so as to enable the first color light emitting device 1111 to emit light; may control the second positive signal line to form the electrical loop within the working time duration of each display sub-frame successively through the coupled second color light emitting device 1112, the output terminal of the driving element 112 and its reference voltage terminal O6, so as to enable the second color light emitting device 1112 to emit light; and may control the second positive signal line to form the electrical loop within the working time duration of each display sub-frame successively through the coupled third color light emitting device 1113, the output terminal of the driving element 112 and its reference voltage terminal O6, so as to enable the third color light emitting device 1113 to emit light.

In some embodiments of the present disclosure, a working process of the electronic device may include an address allocation stage t1 and a data signal transmission stage t3. The logic control circuit 200_1 and the display panel 110_1 of the electronic device are taken as an example, and it is explained in conjunction with the signal timing diagrams shown in FIG. 10 and FIG. 11.

Figure 11:
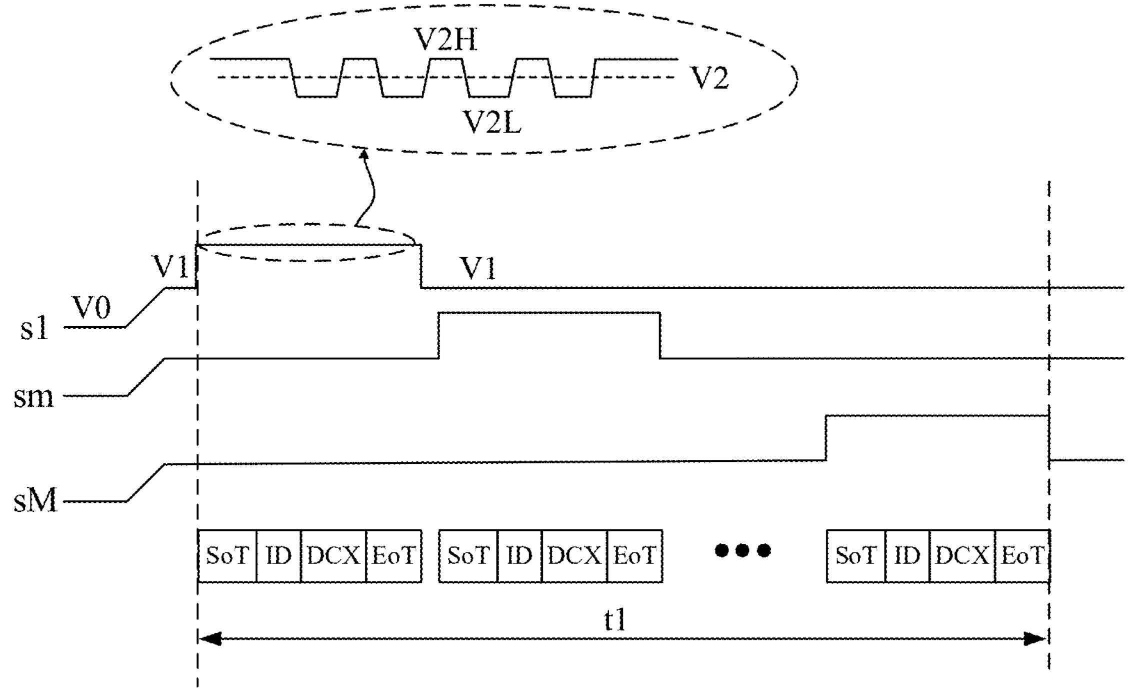
FIG. 11 is a diagram of some yet other signal timings provided by an embodiment of the present disclosure.

In the address allocation stage t1, the logic control circuit 200_1 may input site selection information sm (m is a positive integer, and 1≤m≤M) to each site selection signal line Sm successively. The driving element 112 may receive the corresponding site selection information sm. FIG. 11 is a timing diagram of the site selection information in the embodiment of the present disclosure. For example, the logic control circuit 200_1 transmits site selection information s1 including an address ID of 00000001 to a site selection signal line S1, and the plurality of driving elements 112 arranged in the first direction FS1 and connected with the site selection signal line S1 receive the site selection information s1. The logic control circuit 200_1 transmits site selection information s2 including an address ID of 00000010 to a site selection signal line S2, and the plurality of driving elements 112 arranged in the first direction FS1 and connected with the site selection signal line S2 receive the site selection information s2. The rest is similar and may be done in the same way to complete the address allocation process of the driving elements 112 in each functional unit.

In the data signal transmission stage t3, that is, when the first falling edge of the row synchronous signal HB appears, the logic control circuit 200_1 may provide driving data da carrying the address of each driving element 112 coupled with the logic control circuit 200_1 to each driving signal line Dn respectively. When the corresponding address in the driving data is recognized, the driving element 112 may receive the driving data and generate a light-emitting control signal according to the driving data, so as to control the positive signal line to form the electrical loop successively through the device group coupled with the driving element 112, the output terminal of the driving element 112 and the reference voltage terminal O6. Exemplarily, each driving data da may include a plurality of pieces of sub-data information dam (m is a positive integer, and 1≤m≤M) successively arranged according to a specific order (for example, the specific order may be an order of physical positions of the driving elements). In this way, the plurality of pieces of sub-data information dam may be successively input to each driving signal line Dn, so that each driving signal line Dn successively transmits corresponding sub-data information dam to each driving element 112 in a corresponding column of functional units. The sub-data information may include an address ID corresponding to each functional unit P and pixel data information of a functional unit P corresponding to the address ID and coupled with the driving signal line Dn. When it is recognized that the address ID in the sub-data information dam is the same as the address ID received in the address allocation stage t1, the driving element 112 may receive the sub-data information dam and generate a light-emitting control signal corresponding to each output terminal of the driving element 112 according to the driving data, so as to control the coupled positive signal line (such as the first positive signal line and/or the second positive signal line) to form the electrical loop successively through the device group coupled with the driving element 112, the output terminal of the driving element 112 and the reference voltage terminal O6.

In some examples, a structure of the display panel, the logic control circuit 200_1 and the display panel 100_1 shown in FIG. 3 are taken as an example, in the data signal transmission stage t3, the logic control circuit 200_1 inputs data information including sub-data information da1-daM to the driving signal line Dn, and the driving element 112 coupled with the driving signal line Dn obtains the sub-data information matched with its address ID from the data information including the sub-data information da1-daM. The driving element 112 may generate a light-emitting control signal EM1 corresponding to the first color light emitting device 1111 coupled with the output terminal O1, a light-emitting control signal EM2 corresponding to the second color light emitting device 1112 coupled with the output terminal O2 and a light-emitting control signal EM3 corresponding to the third color light emitting device 1113 coupled with the output terminal O3 according to the sub-data information. Under the control of the light-emitting control signal EM1, at least one positive signal line may form an electrical loop successively through the first color light emitting device 1111, the output terminal O1 of the driving element 112 and the reference voltage terminal O6, so as to enable the first color light emitting device 1111 to emit light; under the control of the light-emitting control signal EM2, the at least one positive signal line may form an electrical loop successively through the second color light emitting device 1112, the output terminal O2 of the driving element 112 and the reference voltage terminal O6, so as to enable the second color light emitting device 1112 to emit light; and under the control of the light-emitting control signal EM3, the at least one positive signal line may form an electrical loop successively through the third color light emitting device 1113, the output terminal O4 of the driving element 112 and the reference voltage terminal O6, so as to enable the third color light emitting device 1113 to emit light.

It should be noted that each driving data da includes a set of the sub-data information corresponding to M driving elements arranged in the second direction FS2, and the sub-data information includes driving information of the device group connected with each driving element among the M driving elements.

Exemplarily, as shown in FIG. 11, the site selection information sm may include a start instruction SoT, an address ID, an interval instruction DCX and an end instruction EoT which are set successively. In practical applications, the addresses ID in the site selection information sm corresponding to the site selection signal lines Sm are different, so as to distinguish the addresses of the driving elements in different rows. Exemplarily, a length of the site selection information sm may be set as 12 bits, wherein the start instruction SoT may be set as 1 bit, the address ID may be set as 8 bits, the interval instruction DCX may be set as 1 bit, and the end instruction EoT may be set as 2 bits.

In some embodiments of the present disclosure, the logic control circuit may further input a power supply voltage to the site selection signal line Sm, and the driving element 112 may receive the power supply voltage transmitted by the site selection signal line Sm through the addressing signal terminal O5. Exemplarily, as shown in FIG. 11, a site selection function (such as transmitting site selection information) and other functions (such as transmitting the power supply voltage VCC) may be distinguished by distinguishing signal amplitudes transmitted by the site selection signal line Sm. For example, the site selection function is performed when a level of the signal amplitude is V2 (for example, a voltage value is 3.3 V), and a display function (such as transmitting the power supply voltage VCC) is performed when the level of the signal amplitude is V1 (for example, the voltage value is 1.8 V). In actual work, first, the signal amplitude transmitted by the site selection signal line Sm needs to be raised from a level V0 (such as 0 V) to the level V1 to enable a component connected with the site selection signal line Sm to enter into a working state, and then, after the signal amplitude changes from the level V1 to fluctuate based on the level V2, the site selection signal line Sm performs the site selection function, and transmits a fluctuation change rule of the signals by modulating the site selection signal line Sm. For example, the signals change between a first amplitude V2H and a second amplitude V2L, and V1<V2L<V2<V2H, and by modulating the change rule of the first amplitude V2 and the second amplitude V2, the site selection information sm may be modulated into the signals, so that the corresponding addresses are transmitted while power is transmitted. For example, the site selection information sm starts with the start instruction SoT, then transmits the address ID and the interval instruction DCX, and finally ends the address allocation of a pixel row with the end instruction EoT. When the signal amplitude fluctuates from the level V2 to the level V1 and remains at the level V1, the site selection signal line Sm may be used to transmit the power supply voltage. That is, the level V1 transmitted by the site selection signal line Sm may be used as the power supply voltage.

Figure 10:
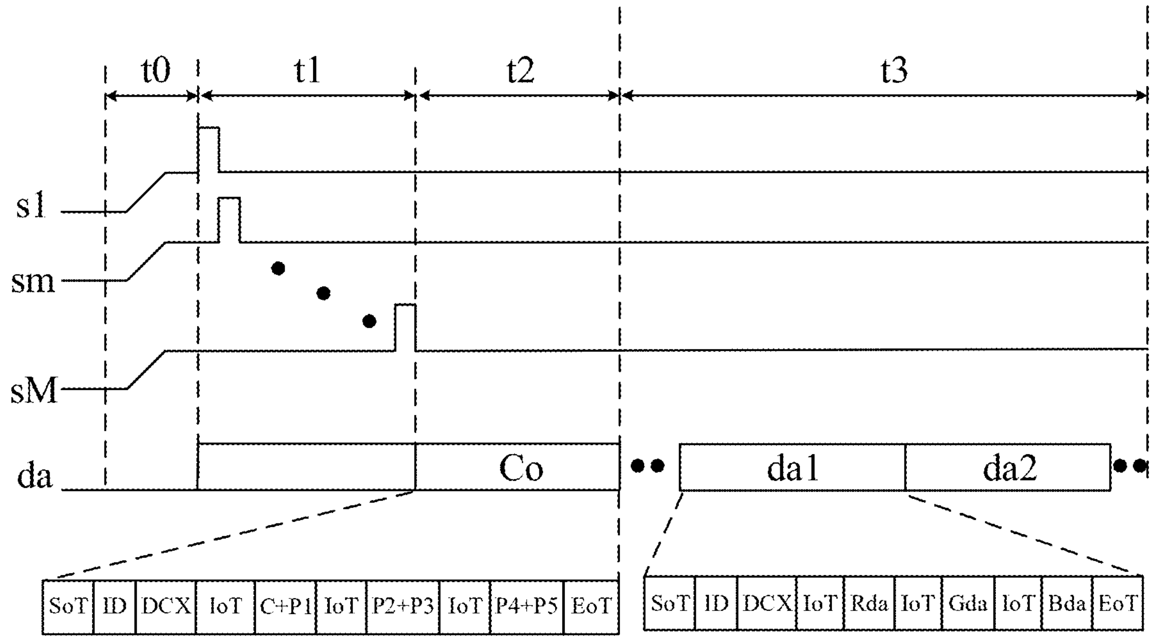
FIG. 10 is a diagram of some other signal timings provided by an embodiment of the present disclosure.

In some embodiments of the present disclosure, the structure shown in FIG. 3 is taken as an example, as shown in FIG. 3 and FIG. 10, the above sub-data information (taking da1 as an example) may include a start instruction SoT, an address ID, a data transmission instruction DCX, an interval instruction IoT, pixel data information Rda, Gda and Bda, and an end instruction EoT. When the data transmission instruction DCX is a set value, it represents that data transmission is performed, for example, when DCX=1, it represents data transmission, and when the value of DCX is recognized to be 1, the driving element 112 transmits the pixel data information in the sub-data information to a corresponding light emitting diode. In addition, the pixel data information Rda represents information required to drive the first color light emitting device 1111 to emit light, the pixel data information Gda represents information required to drive the second color light emitting device 1112 to emit light, and the pixel data information Bda represents information required to drive the third color light emitting device 1113 to emit light. Exemplarily, the length of each piece of sub-data information may be set as 63 bits. The sub-data information da1 is taken as an example, the length of the sub-data information da1 may be set as 63 bits, wherein, the start instruction SoT accounts for 1 bit, the address ID accounts for 8 bits, the data transmission instruction DCX accounts for 1 bit, the interval instruction IoT accounts for 1 bit, the pixel data information Rda, Gda or Bda respectively accounts for 16 bits, and the end instruction EoT accounts for 2 bits. In addition, the interval instruction IoT may also be set between adjacent pieces of pixel data information.

It can be understood that before the stage t1, the driving element 112 of the present disclosure may be in a sleep state, which is a low-power working mode or a non-working state. The power supply voltage VCC is input to the addressing signal terminal O5 of the driving element 112 through the site selection signal line Sm, so that the driving element 112 relieves the sleep state, namely, a stage t0 in FIG. 10.

Figure 12:
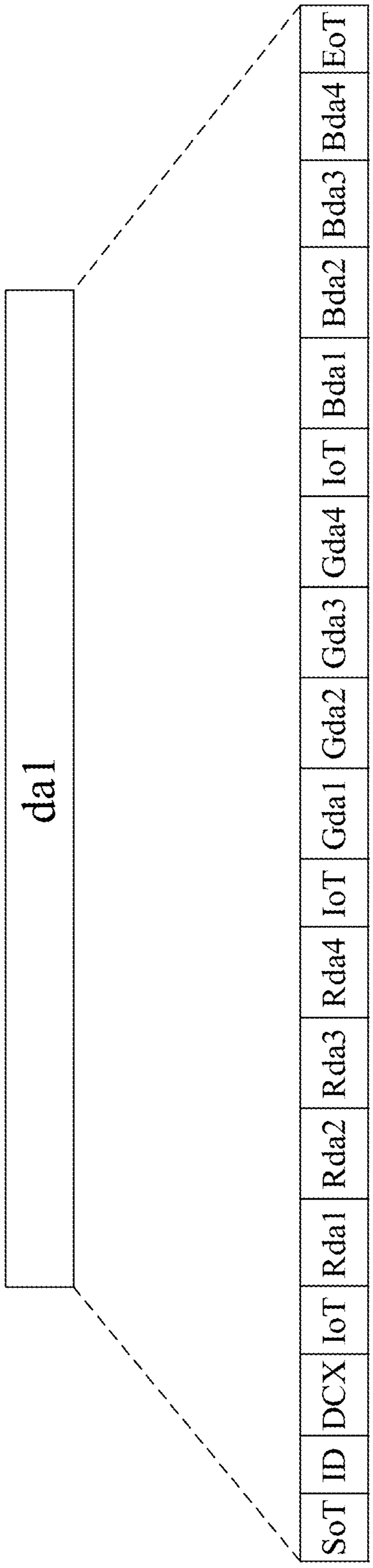
FIG. 12 is a diagram of some yet other signal timings provided by an embodiment of the present disclosure.

In some other examples, a structure of the display panel, the logic control circuit 200_1 and the display panel 100_1 shown in FIG. 5 are taken as an example, in conjunction with FIG. 12, in the data signal transmission stage t3, the logic control circuit 200_1 successively inputs sub-data information da1-daM to the driving signal line Dn, and the driving element 112 coupled with the driving signal line Dn obtains the sub-data information matched with its address ID from the driving data including the sub-data information da1-daM.

The driving element 112 may generate a light-emitting control signal EM1_1 corresponding to the first color light emitting device 1111 coupled with an output terminal O1_1, a light-emitting control signal EM1_2 corresponding to the first color light emitting device 1111 coupled with an output terminal O1_2, a light-emitting control signal EM1_3 corresponding to the first color light emitting device 1111 coupled with an output terminal O1_3, a light-emitting control signal EM1_4 corresponding to the first color light emitting device 1111 coupled with an output terminal O1_4, a light-emitting control signal EM2_1 corresponding to the second color light emitting device 1112 coupled with an output terminal O2_1, a light-emitting control signal EM2_2 corresponding to the second color light emitting device 1112 coupled with an output terminal O2_2, a light-emitting control signal EM2_3 corresponding to the second color light emitting device 1112 coupled with an output terminal O2_3, a light-emitting control signal EM2_4 corresponding to the second color light emitting device 1112 coupled with an output terminal O2_4, a light-emitting control signal EM3_1 corresponding to the third color light emitting device 1113 coupled with an output terminal O3_1, a light-emitting control signal EM3_2 corresponding to the third color light emitting device 1113 coupled with an output terminal O3_2, a light-emitting control signal EM3_3 corresponding to the third color light emitting device 1113 coupled with an output terminal O3_3, and a light-emitting control signal EM3_4 corresponding to the third color light emitting device 1113 coupled with an output terminal O3_4. Under the control of the light-emitting control signals EM1_1-EM1_4, at least one positive signal line may form an electrical loop successively through the first color light emitting device 1111, the output terminal O1 (including any one of O1_1-O1_4) of the driving element 112 and the reference voltage terminal O6, so as to enable the corresponding first color light emitting device 1111 to emit light; under the control of the light-emitting control signals EM2_1-EM2_4, the at least one positive signal line may form an electrical loop successively through the second color light emitting device 1112, the output terminal O2 (including any one of O2_1-O2_4) of the driving element 112 and the reference voltage terminal O6, so as to enable the corresponding second color light emitting device 1112 to emit light; and under the control of the light-emitting control signals EM3_1-EM3_4, the at least one positive signal line may form an electrical loop successively through the third color light emitting device 1113, the output terminal O3 (including any one of O3_1-O3_4) of the driving element 112 and the reference voltage terminal O6, so as to enable the corresponding third color light emitting device 1113 to emit light.

It should be noted that a working process of the display panel shown in FIG. 5 in the address allocation stages t1 and t0 may basically the same as that of the above display panel shown in FIG. 3 in the address allocation stages t1 and t0, which is not repeated here.

In some embodiments of the present disclosure, when the functional unit includes a plurality of device groups, as shown in FIG. 5 and FIG. 12, the sub-data information (taking da1 as an example) may include a start instruction SoT, an address ID, a data transmission instruction DCX, an interval instruction IoT, pixel data information Rda1-Rda4, Gda1-Gda4 and Bda1-Bda4, and an end instruction EoT. When the data transmission instruction DCX is a set value, it represents that data transmission is performed, for example, when DCX=1, it represents data transmission, and when the value of DCX is recognized to be 1, the driving element 112 transmits the pixel data information in the sub-data information to a corresponding light emitting diode. In addition, the pixel data information Rda1-Rda4 represents information required to drive four first color light emitting devices 1111 coupled with the driving element 112 to emit light, the pixel data information Gda1-Gda4 represents information required to drive four second color light emitting devices 1112 coupled with the driving element 112 to emit light, and the pixel data information Bda1-Bda4 represents information required to drive four third color light emitting devices 1113 coupled with the driving element 112 to emit light. Exemplarily, the length of each sub-data information may be set as 63 bits. The sub-data information da1 is taken as an example, the start instruction SoT accounts for 1 bit, the address ID accounts for 8 bits, the data transmission instruction DCX accounts for 1 bit, the interval instruction IoT accounts for 1 bit, sub-pixel data Rda1, Rda2, Rda3 and Rda4 totally account for 16 bits, the sub-pixel data Gda1, Gda2, Gda3 and Gda4 totally account for 16 bits, the sub-pixel data Bda1, Bda2, Bda3 and Bda4 totally account for 16 bits, and the end instruction EoT accounts for 2 bits. In addition, the interval instruction IoT may also be set between any two pieces of adjacent pixel data information. It can be understood that since one driving element 112 drives 12 light emitting devices, a serial number relationship among four pixels 1 connected with the driving element 112 may be realized through an internal digital logic circuit of the driving element 112, so as to accurately distribute the sub-pixel data corresponding to each light emitting device in the pixel data information to the corresponding output terminals.

In some embodiments of the present disclosure, each display frame may further include a current set stage t2 before the data signal transmission stage t3, for example, the current set stage t2 may be located between the address allocation stage t1 and the data signal transmission stage t3. In the current set stage t2, the logic control circuit 200_1 inputs current set information Co with the address ID to each driving signal line Dn. When the driving element 112 recognizes the corresponding address in the current set information Co, the driving element 112 may receive the current set information Co and may control the amplitude of a driving current of the driving element 112 according to the received current set information Co, so as to further accurately control the light-emitting brightness of the corresponding functional unit. Exemplarily, as shown in FIG. 8 and FIG. 10, in the current set stage t2, the logic control circuit 200_1 inputs the current set information Co to each driving signal line Dn. The address ID may be set in the current set information Co. The driving element 112 receives the current set information corresponding to its address from the current set information Co transmitted on the driving signal lines Dn.

Optionally, a length of the current set information Co may be 63 bits, and the current set information Co specifically may include: a start instruction of 1 bit, an address ID of 8 bits, a current set instruction DCX of 1 bit, an interval instruction IoT of 1 bit, data of 16 bits composed of a frame start instruction C and a control instruction P1 (for example, it is required to provide a current amplitude correction coefficient of a light emitting diode coupled with a certain output terminal), an interval instruction IoT of 1 bit, reserved control instruction positions P2+P3 of 16 bits, an interval instruction IoT of 1 bit, reserved control instruction positions P4+P5 of 16 bits, and an end instruction EoT of 2 bits. When the current set instruction DCX is a set value, it represents that current setting is performed, for example, when DCX is 0, it represents that current setting is performed.

It can be understood that in a process of displaying pictures by display frames one by one, the display panel may not display a picture (such as displaying all black) in a first display frame that an electronic device enters after the electronic device is started, but perform the process of stages t0 and t1 in the first display frame, and the electronic device may only perform the stages t2 and t3 in second and subsequent display frames. In this way, each display sub-frame in each display frame may have the process of the stages t2 and t3 respectively. Alternatively, the process of stages t0, t1 and t2 may also be performed in the first display frame, and the electronic device may only perform the process of the stage t3 in the second and subsequent display frames. In this way, each display sub-frame in each display frame may have the process of the stage t3 respectively. That is, in the timing diagram shown in FIG. 9, before the display frame F1, it may further have a display frame F0, and the process of the stages t0 and t1 or the process of the stages t0-t2 may be performed in the display frame F0. The process of the stage t3 is performed in each display sub-frame in the display frames F1-F3.

Figure 13:
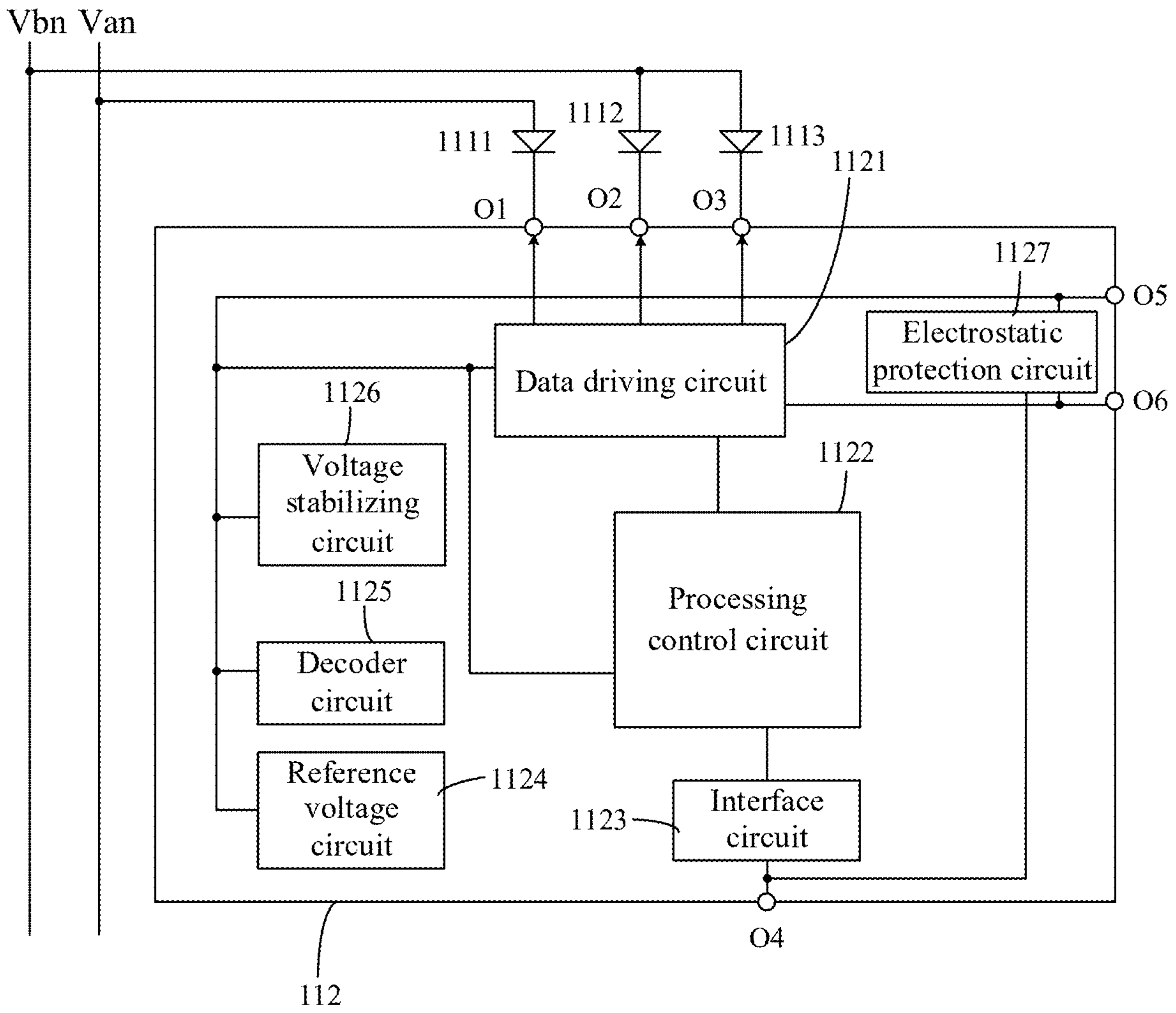
FIG. 13 is a schematic diagram of some structures of a driving element provided by an embodiment of the present disclosure.

In some embodiments of the present disclosure, as shown in FIG. 13, any one of the plurality of driving elements 112 may include a processing control circuit 1122 and a data driving circuit 1121. The processing control circuit 1122 is coupled with a driving signal terminal O4 and an addressing signal terminal O5 respectively, and the data driving circuit 1121 is coupled with the processing control circuit 1122, an output terminal of the driving element 112, the addressing signal terminal O5 and a reference voltage terminal O6 respectively. In addition, the data driving circuit 1121 is coupled with a second terminal of the light emitting device in the corresponding device group through the output terminal. Within a light-emitting period (the light-emitting period may be, for example, a display sub-frame), when a corresponding address in the driving data is recognized by the processing control circuit 1122, the processing control circuit 1122 may receive the driving data through the driving signal terminal O4, generate a light-emitting control signal according to the driving data, and send the light-emitting control signal to the data driving circuit 1121. In addition, within the light-emitting period, the data driving circuit 1121 controls a positive signal line (such as a first positive signal line and a second positive signal line) to form an electrical loop successively through the light emitting device in the device group coupled with the driving element 112, the output terminal of the driving element 112 and the reference voltage terminal O6 according to the received light-emitting control signal, so as to control each light emitting device to emit light through the formed electrical loop.

Figure 14:
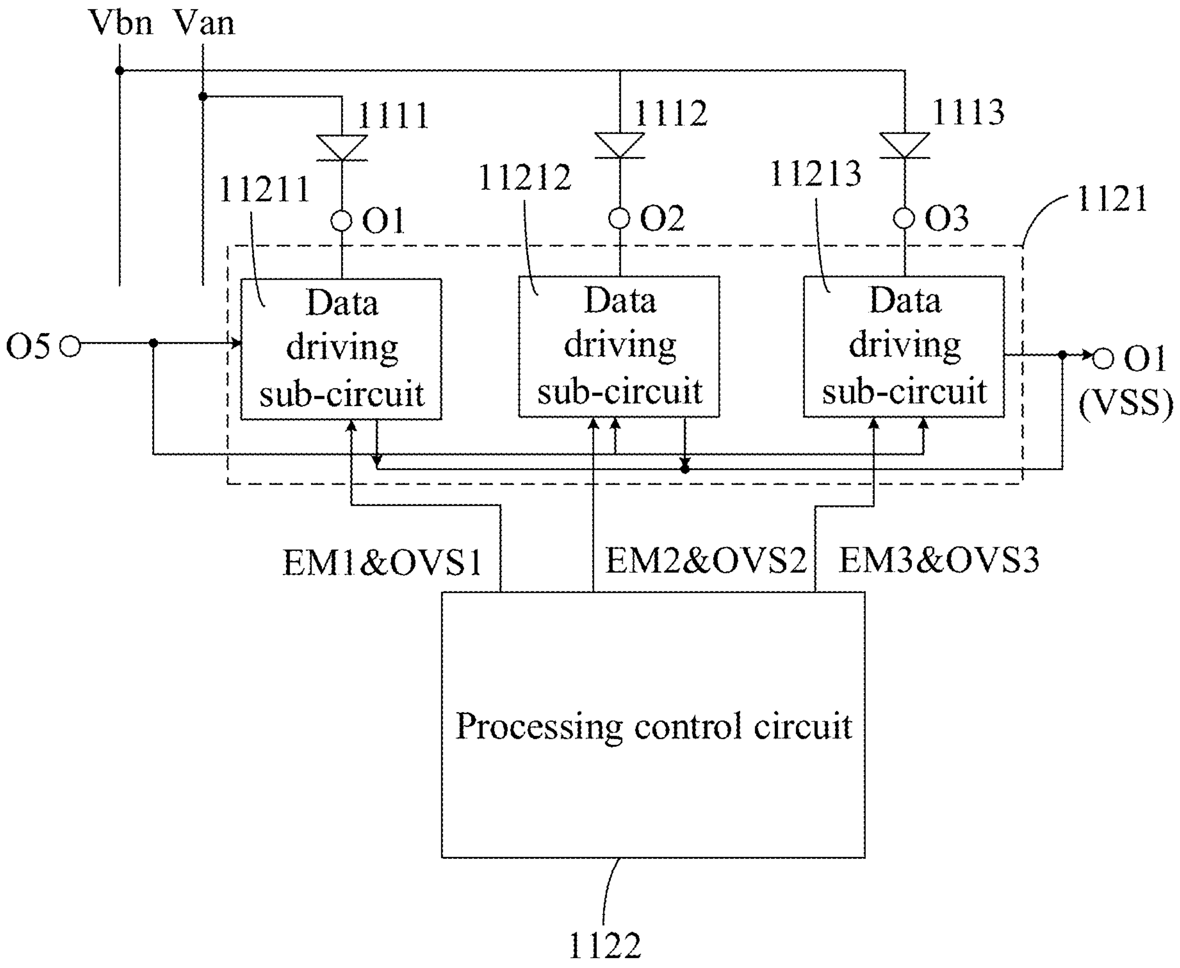
FIG. 14 is a schematic diagram of some partial structures of a driving element provided by an embodiment of the present disclosure.

In some embodiments of the present disclosure, as shown in FIG. 13 and FIG. 14, the data driving circuit 1121 may include at least one data driving sub-circuit (such as 11211, 11212 and 11213). The data driving sub-circuits (such as 11211, 11212 and 11213) each are coupled with the processing control circuit 1122, the addressing signal terminal O5 and the reference voltage terminal O6, and one data driving sub-circuit is coupled with one output terminal, that is, one data driving sub-circuit may be coupled with a negative electrode of a light emitting device in one sub-pixel through the corresponding output terminal. When a power supply voltage VCC is input through the addressing signal terminal O5, the power supply voltage VCC may be input to the data driving sub-circuit, so as to supply power to the data driving sub-circuit. When a reference voltage VSS is input through the reference voltage terminal O6, the reference voltage VSS may be input to the data driving sub-circuit, so as to supply a low voltage to the data driving sub-circuit. Within the light-emitting period, the data driving sub-circuits (such as 11211, 11212 and 11213) may receive the light-emitting control signals corresponding to the coupled device group and control the positive signal line to form the electrical loop successively through the device group coupled with the driving element 112, the output terminal of the driving element 112 and the reference voltage terminal O6 in response to the light-emitting control signals. Exemplarily, as shown in FIG. 3, FIG. 13 and FIG. 14, The data driving sub-circuit 11211 is coupled with an output terminal O1, the output terminal O1 is coupled with a negative electrode of the first color light emitting device 1111, a positive electrode of the first color light emitting device 1111 is coupled with the first positive signal line, and the data driving sub-circuit 11211 may receive a light-emitting control signal EM1 for the corresponding first color light emitting device 1111 to drive to form the electrical loop among the first positive signal line Van, the first color light emitting device 1111, the output terminal O1 and the reference voltage terminal O6 in response to the light-emitting control signal EM1, so that the first color light emitting device 1111 may emit light with current flow. In addition, the data driving sub-circuit 11212 is coupled with an output terminal O2, the output terminal O2 is coupled with a negative electrode of the second color light emitting device 1112, a positive electrode of the second color light emitting device 1112 is coupled with the second positive signal line Vbn, and the data driving sub-circuit 11212 may receive a light-emitting control signal EM2 for the corresponding second color light emitting device 1112 to drive to form the electrical loop among the second positive signal line Vbn, the second color light emitting device 1112, the output terminal O2 and the reference voltage terminal O6 in response to the light-emitting control signal EM2, so that the second color light emitting device 1112 may emit light with current flow. Moreover, a data driving sub-circuit 11213 is coupled with an output terminal O3, the output terminal O3 is coupled with a negative electrode of the third color light emitting device 1113, a positive electrode of the third color light emitting device 1113 is coupled with the second positive signal line Vbn, and the data driving sub-circuit 11213 may receive a light-emitting control signal EM3 for the corresponding third color light emitting device 1113 to drive to form the electrical loop among the second positive signal line Vbn, the third color light emitting device 1113, the output terminal O3 and the reference voltage terminal O6 in response to the light-emitting control signal EM3, so that the third color light emitting device 1113 may emit light with current flow.

In some embodiments of the present disclosure, the light-emitting control signal may include a driving control signal and a current control signal. Each data driving sub-circuit may include a modulation circuit and a constant current source circuit. The constant current source circuit is coupled with the processing control circuit 1122 and the modulation circuit respectively, and the modulation circuit is coupled with a corresponding output terminal. The constant current source circuit may receive the current control signal of the corresponding device group and output a current of a constant amplitude corresponding to current control signal according to the received current control signal. The modulation circuit may receive the driving control signal of the corresponding device group and input a current generated by the constant current source circuit to the coupled output terminal according to an effective level of the received driving control signal, so as to control the positive signal line to form the electrical loop at least successively through the device group coupled with the driving element, the output terminal of the driving element and the reference voltage terminal within a working time duration.

Figure 15:
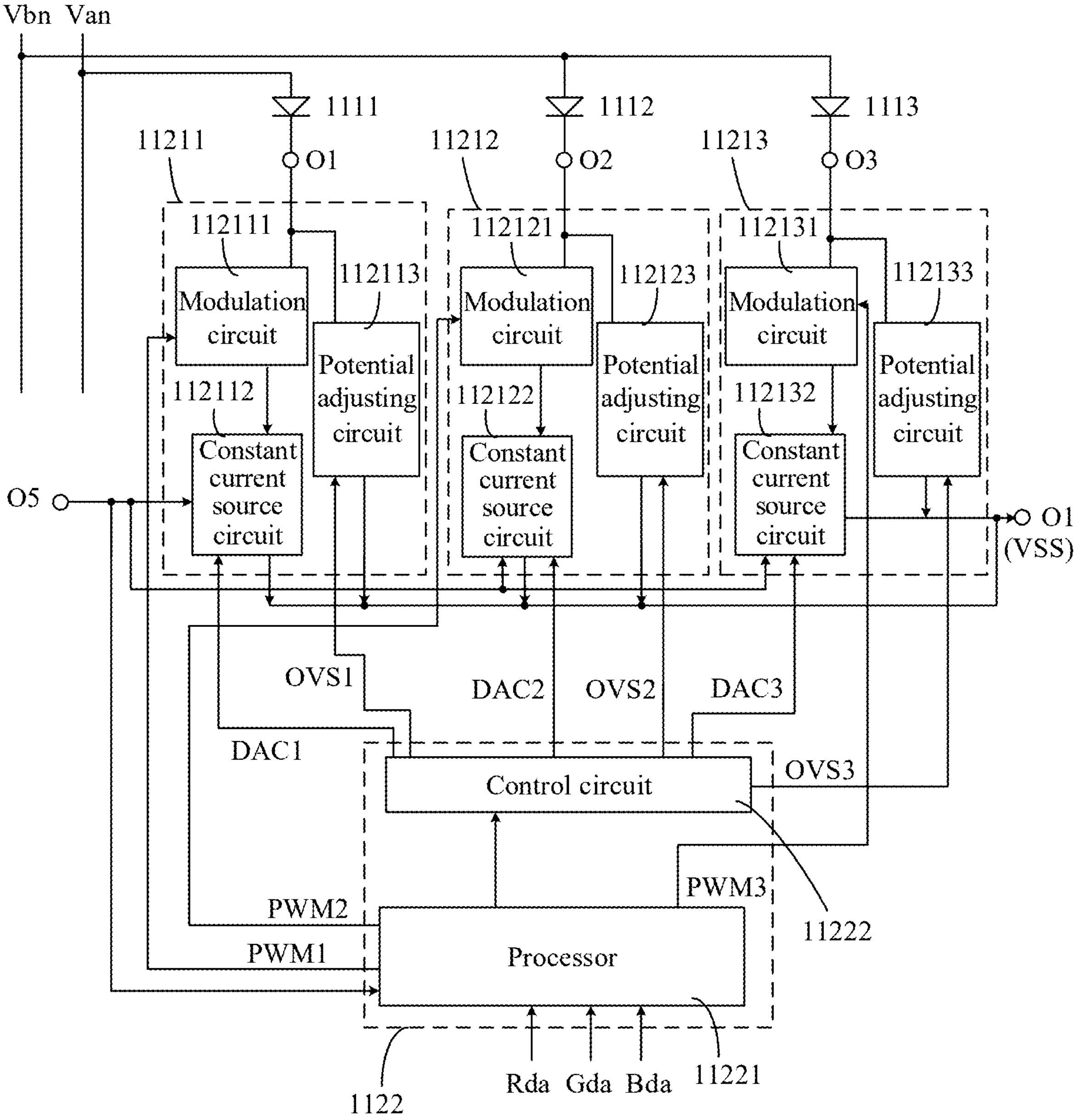
FIG. 15 is a schematic diagram of some other partial structures of a driving element provided by an embodiment of the present disclosure.

Exemplarily, as shown in FIG. 9, FIG. 14 and FIG. 15, the light-emitting control signal EM1 may include a driving control signal PWM1 and a current control signal DAC1, and the data driving sub-circuit 11211 includes: a modulation circuit 112111 and a constant current source circuit 112112. The constant current source circuit 112112 may receive the current control signal DAC1 corresponding to the first color light emitting device 1111 and output a current IL1 of a constant amplitude corresponding to the current control signal DAC1 according to the received current control signal DAC1. The modulation circuit 112111 may receive the driving control signal PWM1 corresponding to the first color light emitting device 1111 and input the current IL1 generated by the constant current source circuit 112112 to the output terminal O1 coupled to the modulation circuit 112111 according to an active level (such as a high level) of the received driving control signal PWM1, to control the first positive signal line Van to form the electrical loop at least successively through the first color light emitting device 1111, the output terminal O1 of the driving element 112 and the reference voltage terminal O6 within the working time duration, so as to enable the first color light emitting device 1111 to emit light. That is, within a duration of the effective level of the driving control signal PWM1, the first color light emitting device 1111 may be considered to be in the working time duration. In this way, the driving control signal PWM1 and the current control signal DAC1 may be combined with each other to control the light-emitting brightness of the first color light emitting device 1111 in each display sub-frame in each display frame.

In addition, the light-emitting control signal EM2 may include a driving control signal PWM2 and a current control signal DAC2, and the data driving sub-circuit 11212 includes: a modulation circuit 112121 and a constant current source circuit 112122. The constant current source circuit 112122 may receive the current control signal DAC2 corresponding to the second color light emitting device 1112 and output a current IL2 of a constant amplitude corresponding to the current control signal DAC2 according to the received current control signal DAC2. The modulation circuit 112121 may receive the driving control signal PWM2 corresponding to the second color light emitting device 1112 and input the current IL2 generated by the constant current source circuit 112122 to the output terminal O2 coupled to the modulation circuit 112121 according to an effective level (such as a high level) of the received driving control signal PWM2, to control the second positive signal line Vbn to form the electrical loop at least successively through the second color light emitting device 1112, the output terminal O2 of the driving element 112 and the reference voltage terminal O6 within the working time duration, so as to enable the second color light emitting device 1112 to emit light. That is, within a duration of the effective level of the driving control signal PWM2, the second color light emitting device 1112 may be considered to be in the working time duration. In this way, the driving control signal PWM2 and the current control signal DAC2 may be combined with each other to control the light-emitting brightness of the second color light emitting device 1112 in each display sub-frame in each display frame.

In addition, the light-emitting control signal EM3 may include a driving control signal PWM3 and a current control signal DAC3, and the data driving sub-circuit 11213 includes: a modulation circuit 112131 and a constant current source circuit 112132. The constant current source circuit 112132 may receive the current control signal DAC3 corresponding to the third color light emitting device 1113 and output a current IL3 of a constant amplitude corresponding to the current control signal DAC3 according to the received current control signal DAC3. The modulation circuit 112131 may receive the driving control signal PWM3 corresponding to the third color light emitting device 1113 and input the current IL3 generated by the constant current source circuit 112132 to the output terminal O3 coupled the modulation circuit 112131 according to an effective level (such as a high level) of the received driving control signal PWM3, to control the second positive signal line Vbn to form the electrical loop at least successively through the third color light emitting device 1113, the output terminal O3 of the driving element 112 and the reference voltage terminal O6 within the working time duration, so as to enable the third color light emitting device 1113 to emit light. That is, within a duration of the effective level of the driving control signal PWM3, the third color light emitting device 1113 may be considered to be in the working time duration. In this way, the driving control signal PWM3 and the current control signal DAC3 may be combined with each other to control the light-emitting brightness of the third color light emitting device 1113 in each display sub-frame in each display frame.

It should be noted that the effective level of the driving control signal may also be a low level, which is not limited here.

To sum up, when the modulation circuit is turned on, the above electrical loop is turned on, and the device group emits light. When the modulation circuit is turned off, the above electrical loop is turned off, and the device group does not emit light. Therefore, the modulation circuit may modulate a current flowing through the device group under the control of the driving control signal PWM, so that the current flowing through the device group appears as a current signal that may be modulated by a pulse width. Therefore, the driving control signal PWM may be used as a pulse width modulation signal. In addition, the modulation circuit may modulate the current flowing through the device group according to a duty ratio and other parameters of the driving control signal PWM, so as to control a working state of the device group. For example, when the device group contains the light emitting device, by increasing the duty ratio of the driving control signal PWM, a total light-emitting duration of the light emitting device in a display frame (or a display sub-frame) may be prolonged, and then total light-emitting brightness of the light emitting device in the display frame (or the display sub-frame) is improved, so that the brightness of the device group where the light emitting device is located is increased. On the contrary, by decreasing the duty ratio of the driving control signal PWM, the total light-emitting duration of the light emitting device in a display frame (or a display sub-frame) may be shortened, and then the total light-emitting brightness of the light emitting device in the display frame (or the display sub-frame) is reduced, so that the brightness of the device group where the light emitting device is located is reduced.

Exemplarily, the modulation circuit may be a switch element, for example, may be a metal-oxide-semiconductor field-effect transistor (MOSFET), a thin film transistor (TFT) and other transistors. Of course, in practical applications, a specific implementation of the modulation circuit may be determined according to the requirements of the practical applications, which is not limited here.

Exemplarily, the constant current source circuit may have various implementations, for example, the constant current source circuit may be set as a constant-current diode, a circuit composed of a digital analog converter and a trigger, a current mirror circuit and the like. Of course, in practical applications, a specific implementation of the constant current source circuit may be determined according to the requirements of the practical applications, which is not limited here.

In some examples, pixel data information Rda of 16 bits corresponding to the first color light emitting device 1111 is taken as an example, the pixel data information of 16 bits corresponding to other light emitting device adopts the same data type and coding rules. Exemplarily, the pixel data information Rda is 16 bits, and may have, but not limited to the following implementations: the current control signal DAC1 accounts for 6 bits and the driving control signal PWM1 accounts for 10 bits; or the current control signal DAC1 accounts for 5 bits and the driving control signal PWM1 accounts for 11 bits; or the current control signal DAC1 accounts for 4 bits and the driving control signal PWM1 accounts for 12 bits; or the current control signal DAC1 accounts for 3 bits and the driving control signal PWM1 accounts for 13 bits.

The situation that the current control signal DAC1 accounts for 6 bits and the driving control signal PWM1 accounts for 10 bits as an example, the current control signal DAC1 may control the constant current source circuit 112112 to output 64 ($2^6$) types of different current amplitudes. The constant current source circuit 112112 may have different current gears, such as 2 uA, 3 uA and 5 uA. The current gear being 2 uA is taken as an example, a maximum value of a current IL1 that can be output by the constant current source circuit 112112 is 128 uA (2 uA*64), and a minimum value is 2 uA (2 uA*1), so that the amplitude of the current IL1 may totally have 64 optional values, and different brightness requirements of the first color light emitting device 1111 may be met. The driving control signal PWM1 accounts for 10 bits, and the duty ratio of the driving control signal PWM1 may have 1024 ($2^{10}$) types of different cases. The more bits the driving control signal PWM1 accounts for, the more the types of the duty ratio.

Since the positive and negative electrodes of each light emitting device are correspondingly connected with connection bonding pads on a base substrate, capacitance may be formed among the connection bonding pads in a case of a voltage difference between the connection bonding pads, the capacitance is a self parasitic capacitance of the light emitting device, and a capacitance value is from several picofarad (pF) to tens of pF. In an equivalent circuit, the capacitance is connected in parallel with the light emitting devices. Since the electronic device includes a plurality of device groups, and each device group includes at least one light emitting device, the capacitance values of the self parasitic capacitance of the light emitting devices are different due to the fluctuation of the manufacturing process or different light-emitting states. Therefore, the time for different light emitting devices to switch from a turned-off state (namely off state ZT-off) to a light-emitting state (namely on state ZT-on) or from the light-emitting state (namely on state ZT-on) to the turned-off state (namely off state ZT-off) is different, resulting in different light emitting devices actually showing different brightness when they should display the same brightness, thus affecting visual perception.

It can be understood that although each connection bonding pad may also form capacitance with the signal lines due to overlapping, the capacitance value of the capacitance is smaller, which will not be discussed in the embodiment of the present disclosure.

Figure 16:
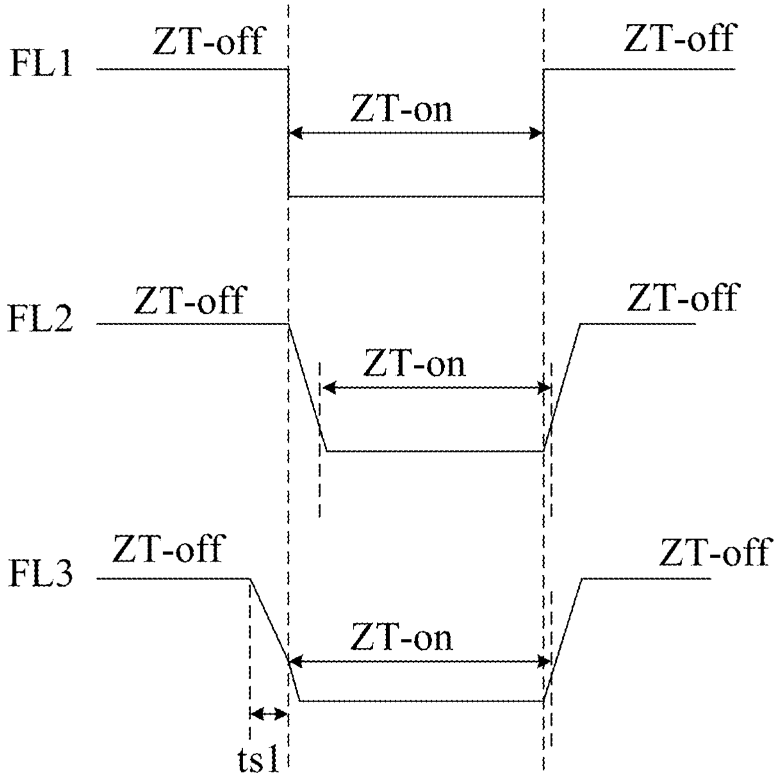
FIG. 16 is a diagram of some yet other signal timings provided by an embodiment of the present disclosure.

Exemplarily, the first color light emitting device 1111 is taken as an example, as shown in FIG. 13 to FIG. 16, in FIG. 16, FL1 represents a theoretical value of voltage change of a negative electrode of the first color light emitting device 1111, and FL2 represents an actual value of the voltage change of the negative electrode of the first color light emitting device 1111. A positive electrode of the first color light emitting device 1111 is coupled with the first positive signal line Van, and the negative electrode of the first color light emitting device 1111 is coupled with the reference voltage terminal O6 through the modulation circuit 112111 and the constant current source circuit 112112. Due to existence of the self parasitic capacitance of the first color light emitting device 1111, the voltage of the negative electrode of the first color light emitting device 1111 cannot be pulled down from a high level (such as 2V) to the reference voltage VSS (such as 1V) instantaneously, that is, the first color light emitting device 1111 cannot be quickly switched from the turned-off state (namely off state ZT-off) to the light-emitting state (namely on state ZT-on), thereby shortening light-emitting time of the first color light emitting device 1111. Similarly, when the driving element 112 is working, it may also generate similar self parasitic capacitance, the parasitic capacitance may also cause the first color light emitting device 1111 to be unable to be quickly switched from the turned-off state (namely off state ZT-off) to the light-emitting state (namely on state ZT-on), thereby shortening the light-emitting time (namely time of the on state ZT-on) of the first color light emitting device 1111.

It can be understood that when the light emitting device is in the light-emitting state (namely on state ZT-on), as long as a voltage difference between the positive and negative electrodes of the light emitting device is greater than a lighting voltage of the light emitting device, the light emitting device may emit light. Therefore, the voltage of the negative electrode of the light emitting device does not need to be reduced to the reference voltage VSS to enable the light emitting device to emit light, instead, the value of the voltage of the negative electrode of the light emitting device plus the lighting voltage of the light emitting device is smaller than the voltage of the positive electrode of the light emitting device, and the light emitting device may be in the light-emitting state (namely on state ZT-on).

In order to solve the above problems, the driving element 112 provided by the embodiment of the present disclosure may further adjust a potential of a second terminal of the device group coupled with the driving element before the working time duration of the light-emitting period, for example, the potential of the second terminal of the device group is pulled down. Exemplarily, as shown in FIG. 13 and FIG. 16, a device group includes a first color light emitting device 1111, a second color light emitting device 1112 and a third color light emitting device 1113; a second terminal of the device group includes a negative electrode of the first color light emitting device 1111, a negative electrode of the second color light emitting device 1112 and a negative electrode of the third color light emitting device 1113; and the negative electrode of the first color light emitting device 1111 is connected with an output terminal O1 of the driving element 112, the negative electrode of the second color light emitting device 1112 is connected with an output terminal O2 of the driving element 112, and the negative electrode of the third color light emitting device 1113 is connected with an output terminal O3 of the driving element 112. FL3 represents an actual value of the voltage of the negative electrode of the first color light emitting device 1111 after being adjusted by a potential adjusting circuit. Before the working time duration of the first color light emitting device 1111, the driving element 112 may adjust a potential of the negative electrode of the first color light emitting device 1111, so that the potential of the negative electrode of the first color light emitting device 1111 may be reduced to a critical state that can make the first color light emitting device 1111 light up in advance. In this way, the first color light emitting device 1111 may be quickly switched from the turned-off state (namely off state ZT-off) to the light-emitting state (namely on state ZT-on) at the beginning of the working time duration, so that actual time of the first color light emitting device 1111 being in the light-emitting state (namely on state ZT-on) may be as same as a theoretical value as possible. Similarly, before the working time duration of the second color light emitting device 1112, the driving element 112 may adjust a potential of the negative electrode of the second color light emitting device 1112, so that the potential of the negative electrode of the second color light emitting device 1112 may be reduced to a critical state that can make the second color light emitting device 1112 light up in advance. In this way, the second color light emitting device 1112 may be quickly switched from the turned-off state (namely off state ZT-off) to the light-emitting state (namely on state ZT-on) at the beginning of the working time duration, so that actual time of the second color light emitting device 1112 being in the light-emitting state (namely on state ZT-on) may be as same as a theoretical value as possible. Similarly, before the working time duration of the third color light emitting device 1113, the driving element 112 may adjust a potential of the negative electrode of the third color light emitting device 1113, so that the potential of the negative electrode of the third color light emitting device 1113 may be reduced to a critical state that can make the third color light emitting device 1113 light up in advance. In this way, the third color light emitting device 1113 may be quickly switched from the turned-off state (namely off state ZT-off) to the light-emitting state (namely on state ZT-on) at the beginning of the working time duration, so that actual time of the third color light emitting device 1113 being in the light-emitting state (namely on state ZT-on) may be as same as a theoretical value as possible.

Figure 17:
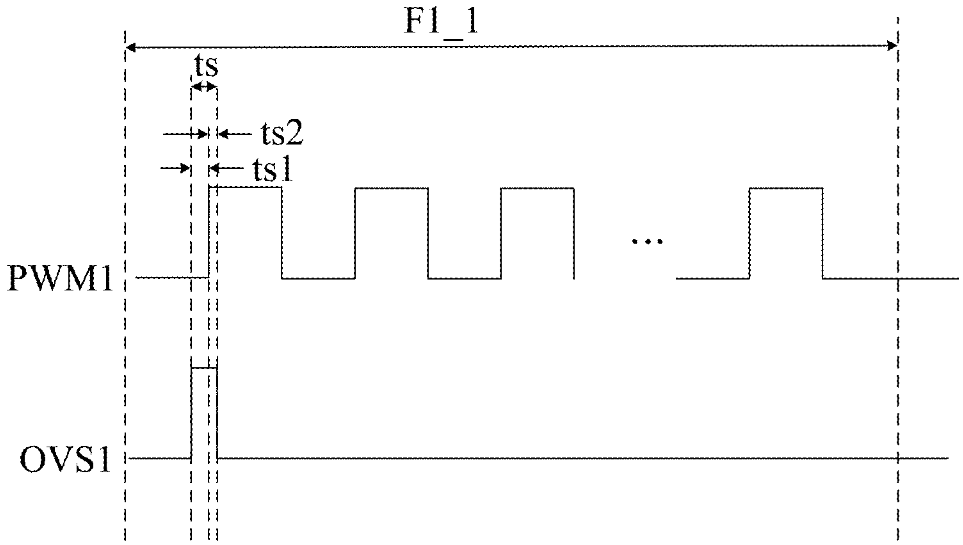
FIG. 17 is a diagram of some yet other signal timings provided by an embodiment of the present disclosure.

In some embodiments of the present disclosure, any one of the plurality of driving elements may control the second terminal of the device group coupled with the driving element to be on with the reference voltage terminal of the driving element for a first compensation time before the working time duration, so as to adopt the reference voltage loaded on the reference voltage terminal to adjust a potential of the second terminal of the coupled device group within the first compensation time. Exemplarily, as shown in FIG. 9, FIG. 13 and FIG. 17, the driving element 112 may control the negative electrode of the first color light emitting device 1111 to be on with the reference voltage terminal O6 for a first compensation time ts1 before the working time duration of the first color light emitting device 1111 (for example, within a display sub-frame F1_1, before a first rising edge of a driving control signal PWM1 arrives), so as to adjust a potential of the negative electrode of the first color light emitting device 1111 within the first compensation time ts1 by adopting a reference voltage VSS loaded on the reference voltage terminal O6; control the negative electrode of the second color light emitting device 1112 to be on with the reference voltage terminal O6 for the first compensation time before the working time duration of the second color light emitting device 1112, so as to adjust a potential of the negative electrode of the second color light emitting device 1112 within the first compensation time by adopting the reference voltage loaded on the reference voltage terminal O6; and control the negative electrode of the third color light emitting device 1113 to be on with the reference voltage terminal O6 for the first compensation time before the working time duration of the third color light emitting device 1113, so as to adjust a potential of the negative electrode of the third color light emitting device 1113 within the first compensation time by adopting the reference voltage loaded on the reference voltage terminal O6.

In some embodiments of the present disclosure, any one of the plurality of driving elements may control the positive signal line to form an electrical loop at least successively through the device group coupled with the driving element, the output terminal of the driving element and the reference voltage terminal at an end moment of the first compensation time. Exemplarily, as shown in FIG. 9, FIG. 13 and FIG. 17, the driving element 112 may control the first positive signal line Van, the first color light emitting device 1111, the output terminal O1 and the reference voltage terminal O6 to form the electrical loop at the end moment of the first compensation time ts1 for the switch-on between the negative electrode of the first color light emitting device 1111 and the reference voltage terminal O6; control the second positive signal line, the second color light emitting device 1112, the output terminal O2 and the reference voltage terminal O6 to form the electrical loop at the end moment of the first compensation time for the switch-on between the negative electrode of the second color light emitting device 1112 and the reference voltage terminal O6; and control the second positive signal line, the third color light emitting device 1113, the output terminal O3 and the reference voltage terminal O6 to form the electrical loop at the end moment of the first compensation time for the switch-on between the negative electrode of the third color light emitting device 1113 and the reference voltage terminal O6.

In some embodiments of the present disclosure, any one of the plurality of driving elements may control the second terminal of the device group coupled with the driving element to be on with the reference voltage terminal of the driving element for a second compensation time within the working time duration. Exemplarily, as shown in FIG. 9, FIG. 13 and FIG. 17, the first color light emitting device 1111 is taken as an example, the driving element 112 may control the negative electrode of the first color light emitting device 1111 to be on with the reference voltage terminal O6 for the second compensation time ts2 within the working time duration of the first color light emitting device 1111 (for example, within a display sub-frame F1_1 and any effective level time duration of the driving control signal PWM1, such as a first effective level time duration of the driving control signal PWM1), so as to adjust the potential of the negative electrode of the first color light emitting device 1111 within the second compensation time ts2 by adopting the reference voltage loaded on the reference voltage terminal O6.

In some embodiments of the present disclosure, the first compensation time and the second compensation time may be successively-continuous time durations. Exemplarily, as shown in FIG. 9, FIG. 13 and FIG. 17, the first compensation time ts1 and the second compensation time ts2 corresponding to the first color light emitting device 1111 are successively-continuous time durations. The first compensation time and the second compensation time corresponding to the second color light emitting device 1112 are successively-continuous time durations. The first compensation time and the second compensation time corresponding to the third color light emitting device 1113 are successively-continuous time durations.

In some embodiments of the present disclosure, a device group includes a plurality of devices (such as light emitting devices), a second terminal of the device group may include negative electrodes of a plurality of light emitting devices, the negative electrode of each light emitting device is connected with different output terminals of the same driving element, and then, the first compensation time and/or the second compensation time corresponding to each light emitting device are different, so that the potentials of the negative electrodes of different light emitting devices may be accurately adjusted.

Since there is an overlapping time duration between the second compensation time and the working time duration of the light emitting device, in order to avoid the influence of the second compensation time on the brightness of the light emitting device when it is normally working, in some embodiments of the present disclosure, for at least one device group among the plurality of device groups, the second compensation time corresponding to the device group is less than the first compensation time corresponding to the device group. Specifically, the second compensation time corresponding to each device in the device group may be less than the first compensation time corresponding to each device in the device group, for example, the second compensation time corresponding to each light emitting device may be less than the first compensation time corresponding to each light emitting device. During specific implementation, the second compensation time is less than half of the first compensation time.

In some embodiments of the present disclosure, at least two device groups among the plurality of device groups correspond to different first compensation times and/or second compensation times respectively. The plurality of devices belonging to the same device group may correspond to different first compensation times and/or second compensation times respectively when realizing a specific gray scale. For example, a device group includes a first color light emitting device 1111, a second color light emitting device

1112 and a third color light emitting device 1113, a first compensation time corresponding to the first color light emitting device 1111 is 60 ns, a first compensation time corresponding to the second color light emitting device 1112 is 35 ns and a first compensation time corresponding to the third color light emitting device 1113 is 8 ns, then, a second compensation time corresponding to the first color light emitting device 1111 may be 10 ns, a second compensation time corresponding to the second color light emitting device 1112 may be 5 ns and a second compensation time corresponding to the third color light emitting device 1113 may be 2 ns.

In some embodiments of the present disclosure, the second compensation times corresponding to at least part of the plurality of device groups may be the same. Exemplarily, the second compensation times corresponding to the at least part of device groups may be set as 1 ns, which may reduce the design difficulty of the second compensation time.

In some embodiments of the present disclosure, any one of the plurality of driving elements 112 may control the second terminal of the device group coupled with the driving element to be on with the reference voltage terminal O6 of the driving element for a potential compensation time according to the pre-stored potential compensation time corresponding to the device group coupled with the driving element, and the potential compensation time is a sum of the first compensation time and the second compensation time. Of course, the potential compensation time is the first compensation time. A situation that the potential compensation time is the sum of the first compensation time and the second compensation time is taken as an example for illustration below. When the potential compensation time is the first compensation time, its working process may be done in the same way, which is not repeated here.

In some embodiments of the present disclosure, since the potential of the negatively electrode of the light emitting device is adjusted before the light emitting device emits light, the self parasitic capacitance of the light emitting device discharges in advance, but it is necessary to avoid that the light emitting device emits light in a non-working time duration due to the potential of the negative electrode of the light emitting device being adjusted in advance. Therefore, the first compensation time ts1 is provided with a maximum value ts1−max, and during specific implementation, the first compensation time ts1 should not exceed the maximum value ts1−max. Exemplarily, the maximum value ts1−max of the first compensation time ts1 may be determined according to a formula: $V_+ - V_F = V_s \cdot e\ ts1-max/R_{LED} \cdot C_{LED}$. Where, $V_+$ represents a voltage of a positive electrode of the light emitting device, $V_F$ represents a lighting voltage of the light emitting device, $V_S$ represents a voltage of a negative electrode of the light emitting device before the start of the first compensation time ts1, $R_{LED}$ represents a resistance value of a self equivalent resistance of the light emitting device, and $C_{LED}$ represents a capacitance value of a self parasitic capacitance of the light emitting device. Exemplarily, as shown in FIG. 16, the first color light emitting device is taken as an example, a voltage of the positive electrode of the first color light emitting device is VLED1, then $V_+$=VLED1, $V_F$ represents the lighting voltage of the first color light emitting device, $V_S$ represents the voltage of the negative electrode of the first color light emitting device before the start of the first compensation time ts1, $R_{LED}$ represents the resistance value of the self equivalent resistance of the first color light emitting device, and $C_{LED}$ represents the capacitance value of the self parasitic capacitance of the first color light emitting device; and it is substituted into the above formula, which may determine the maximum value of the first compensation time ts1 corresponding to the first color light emitting device. The maximum values of the first compensation times ts1 of other light emitting devices are calculated in the same way, which will not be repeated here.

In some embodiments of the present disclosure, a processing control circuit 1122 may further, according to the potential compensation time, generate a potential adjusting control signal within a light-emitting period, and send the potential adjusting control signal to a data driving circuit. The data driving circuit may control the second terminal of the corresponding device group to be on with the reference voltage terminal according to an effective level of the received potential adjusting control signal, wherein a duration of the effective level of the potential adjusting control signal corresponding to the device group is the potential compensation time. Exemplarily, as shown in FIG. 3, and FIG. 13 to FIG. 15, the processing control circuit 1122 may further, according to the potential compensation time ts corresponding to an output terminal O1, generate a potential adjusting control signal OVS1 within the light-emitting period, and send the potential adjusting control signal OVS1 to the data driving circuit 1121. The data driving circuit 1121 may control the negative electrode of the first color light emitting device 1111 to be on with the reference voltage terminal O6 according to an effective level (such as a high level) of the received potential adjusting control signal OVS1. The processing control circuit 1122 may further, according to the potential compensation time ts corresponding to an output terminal O2, generate a potential adjusting control signal OVS2 within the light-emitting period, and send the potential adjusting control signal OVS2 to the data driving circuit 1121. The data driving circuit 1121 may control the negative electrode of the second color light emitting device 1112 to be on with the reference voltage terminal O6 according to an effective level (such as a high level) of the received potential adjusting control signal OVS2. The processing control circuit 1122 may further, according to the potential compensation time ts corresponding to an output terminal O3, generate a potential adjusting control signal OVS3 within the light-emitting period, and send the potential adjusting control signal OVS3 to the data driving circuit 1121. The data driving circuit 1121 may control the negative electrode of the third color light emitting device 1113 to be on with the reference voltage terminal O6 according to an effective level (such as a high level) of the received potential adjusting control signal OVS3.

In some embodiments of the present disclosure, when the data driving circuit includes a data driving sub-circuit, the data driving sub-circuit may receive the potential adjusting control signal output by the processing control circuit 1122 and control the second terminal of the coupled device group to be on with the reference voltage terminal in response to the potential adjusting control signal. Exemplarily, as shown in FIG. 3, and FIG. 13 to FIG. 15, a data driving sub-circuit 11211 may receive the potential adjusting control signal OVS1 and control the negative electrode of the first color light emitting device 1111 to be on with the reference voltage terminal O6 in response to the effective level (such as a high level) of the potential adjusting control signal OVS1. A data driving sub-circuit 11212 may receive the potential adjusting control signal OVS2 and control the negative electrode of the second color light emitting device 1112 to be on with the reference voltage terminal O6 in response to the effective level (such as a high level) of the potential adjusting control signal OVS2. A data driving sub-circuit 11213 may receive the potential adjusting control signal OVS3 and control the negative electrode of the third color light emitting device 1113 to be on with the reference voltage terminal O6 in response to the effective level (such as a high level) of the potential adjusting control signal OVS3.

In some embodiments of the present disclosure, the data driving sub-circuit may further include a potential adjusting circuit, and the potential adjusting circuit is coupled with the processing control circuit and the corresponding output terminal respectively. In addition, the potential adjusting circuit may receive the potential adjusting control signal of the corresponding device group and control the second terminal of the coupled device group to be on with the reference voltage terminal according to the received potential adjusting control signal. Exemplarily, as shown in FIG. 3, and FIG. 13 to FIG. 15, the data driving sub-circuit 11211 includes: a potential adjusting circuit 112113, and the potential adjusting circuit 112113 may receive the potential adjusting control signal OVS1 and control the negative electrode of into first color light emitting device 1111 to be on with the reference voltage terminal O6 in response to the effective level of the potential adjusting control signal OVS1. The data driving sub-circuit 11212 includes a potential adjusting circuit 112123, and the potential adjusting circuit 112113 may receive the potential adjusting control signal OVS2 and control the negative electrode of the second color light emitting device 1112 to be on with the reference voltage terminal O6 in response to the effective level of the potential adjusting control signal OVS2. The data driving sub-circuit 11213 includes a potential adjusting circuit 112133, and the potential adjusting circuit 112133 may receive the potential adjusting control signal OVS3 and control the negative electrode of the third color light emitting device 1113 to be on the reference voltage terminal O6 in response to the effective level of the potential adjusting control signal OVS3.

Exemplarily, the potential adjusting circuit may include a switch element, for example, may be a metal-oxide-semiconductor field-effect transistor (MOSFET), a thin film transistor (TFT) and other transistors. Of course, in practical applications, a specific implementation of the potential adjusting circuit may be determined according to the requirements of the practical applications, which is not limited here.

In some embodiments of the present disclosure, as shown in FIG. 13 to FIG. 15, the processing control circuit 1122 may include a processor 11221 and a control circuit 11222. The processor 11221 may generate a driving control signal corresponding to each device group coupled with the processor 11221 according to received pixel data information Rda, Gda and Bda and send the driving control signal to a data driving sub-circuit corresponding to each device group. The processor 11221 may further generate current amplitude control information and potential adjusting information corresponding to each coupled device group according to the received pixel data information and a pre-stored potential compensation time corresponding to each device group to provide to the control circuit 11222. The control circuit 11222 may generate a current control signal in a light-emitting control signal corresponding to each device group according to the received current amplitude control information corresponding to each device group, generate a potential adjusting control signal corresponding to each device group according to the received potential adjusting information corresponding to each device group, and send the generated current control signal and the potential adjusting control signal corresponding to each device group to the data driving sub-circuit corresponding to each device group.

Exemplarily, as shown in FIG. 3, and FIG. 13 to FIG. 15, the processor 11221 may generate a driving control signal PWM1 and current amplitude control information corresponding to the first color light emitting device 1111 according to received pixel data information Rda and generate potential adjusting information corresponding to the first color light emitting device 1111 according to a pre-stored potential compensation time corresponding to the first color light emitting device 1111. The processor 11221 may generate a driving control signal PWM2 and current amplitude control information corresponding to the second color light emitting device 1112 according to received pixel data information Gda and generate potential adjusting information corresponding to the second color light emitting device 1112 according to a pre-stored potential compensation time corresponding to the second color light emitting device 1112. The processor 11221 may generate a driving control signal PWM3 and current amplitude control information corresponding to the third color light emitting device 1113 according to received pixel data information Bda and generate potential adjusting information corresponding to the third color light emitting device 1113 according to a pre-stored potential compensation time corresponding to the third color light emitting device 1113.

Then, the processor 11221 sends the driving control signal PWM1 to the data driving sub-circuit 11211, sends the driving control signal PWM2 to the data driving sub-circuit 11212, sends the driving control signal PWM3 to the data driving sub-circuit 11213, and sends the current amplitude control information and the potential adjusting information corresponding to each color light emitting device to the control circuit 11222. The control circuit 11222 may generate the current control signals DAC1, DAC2 and DAC3 according to the current amplitude control information, and generate the potential adjusting control signals OVS1, OVS2 and OVS3 according to the potential adjusting information. Then, the control circuit 11222 may send the current control signal DAC1 and the potential adjusting control signal OVS1 to the data driving sub-circuit 11211, sends the current control signal DAC2 and the potential adjusting control signal OVS2 to the data driving sub-circuit 11212 and sends the current control signal DAC3 and the potential adjusting control signal OVS3 to the data driving sub-circuit 11213.

The potential adjusting circuit 112113 in the data driving sub-circuit 11211 may receive the potential adjusting control signal OVS1 and control the negative electrode of the first color light emitting device 1111 to be on with the reference voltage terminal O6 in response to the effective level of the potential adjusting control signal OVS1. The constant current source circuit 112112 may receive the current control signal DAC1 corresponding to the first color light emitting device 1111 and output a current IL1 of a constant amplitude corresponding to the current control signal DAC1 according to the received current control signal DAC1. The modulation circuit 112111 may receive the driving control signal PWM1 corresponding to the first color light emitting device 1111 and input the current IL1 generated by the constant current source circuit 112112 to the coupled output terminal O1 according to an effective level (such as a high level) of the received driving control signal PWM1, to control the first positive signal line to form the electrical loop at least successively through the first color light emitting device 1111, the output terminal O1 of the driving element 112 and the reference voltage terminal O6 within the working time duration, so as to enable the first color light emitting device 1111 to emit light. In this way, the driving control signal PWM1, the current control signal DAC1 and the potential adjusting control signal OVS1 may be combined with one another to control the light-emitting brightness and time of the first color light emitting device 1111 in each display sub-frame.

The potential adjusting circuit 112123 in the data driving sub-circuit 11212 may receive the potential adjusting control signal OVS2 and control the negative electrode of the second color light emitting device 1112 to be on with the reference voltage terminal O6 in response to the effective level of the potential adjusting control signal OVS2. The constant current source circuit 112122 may receive the current control signal DAC2 corresponding to the second color light emitting device 1112 and output a current IL2 of a constant amplitude corresponding to the current control signal DAC2 according to the received current control signal DAC2. The modulation circuit 112121 may receive the driving control signal PWM2 corresponding to the second color light emitting device 1112 and input the current IL2 generated by the constant current source circuit 112122 to the coupled output terminal O2 according to an effective level (such as a high level) of the received driving control signal PWM2, to control the second positive signal line to form the electrical loop at least successively through the second color light emitting device 1112, the output terminal O2 of the driving element 112 and the reference voltage terminal O6 within the working time duration, so as to enable the second color light emitting device 1112 to emit light. That is, within a duration of the effective level of the driving control signal PWM2, the second color light emitting device 1112 may be considered to be in the working time duration. In this way, the driving control signal PWM2, the current control signal DAC2 and the potential adjusting control signal OVS2 may be combined with one another to control the light-emitting brightness and time of the second color light emitting device 1112 in each display sub-frame.

The potential adjusting circuit 112133 in the data driving sub-circuit 11213 may receive the potential adjusting control signal OVS3 and control the negative electrode of the third color light emitting device 1113 to be on with the reference voltage terminal O6 in response to the effective level of the potential adjusting control signal OVS3. The constant current source circuit 112132 may receive the current control signal DAC3 corresponding to the third color light emitting device 1113 and output a current IL3 of a constant amplitude corresponding to the current control signal DAC3 according to the received current control signal DAC3. The modulation circuit 112131 may receive the driving control signal PWM3 corresponding to the third color light emitting device 1113 and input the current IL3 generated by the constant current source circuit 112132 to the coupled output terminal O3 according to an effective level (such as a high level) of the received driving control signal PWM3, to control the second positive signal line to form the electrical loop at least successively through the third color light emitting device 1113, the output terminal O3 of the driving element 112 and the reference voltage terminal O6 within the working time duration, so as to enable the third color light emitting device 1113 to emit light. That is, within a duration of the effective level of the driving control signal PWM3, the third color light emitting device 1113 may be considered to be in the working time duration. In this way, the driving control signal PWM3, the current control signal DAC3 and the potential adjusting control signal OVS3 may be combined with one another to control the light-emitting brightness and time of the third color light emitting device 1113 in each display sub-frame.

In some embodiments of the present disclosure, the potential compensation time may be stored in the processor 11221. In order to reduce the storage requirements of the processor 11221, exemplarily, the control circuit may store the potential compensation time of the device group corresponding to each coupled driving element 112. For example, a system circuit stores the potential compensation time of the device group corresponding to each coupled driving element 112. When an electronic device is started, the system circuit may send the potential compensation time of the device group corresponding to each driving element 112 to each driving element 112. When the electronic device is started, the driving elements 112 may receive and store the potential compensation time sent by the system circuit, and clear the stored potential compensation time when the electronic device is shut down. Exemplarily, the system circuit may send the potential compensation time of the device group corresponding to each driving element 112 to each driving element 112 in a display frame F0, and the driving elements 112 receive and store the potential compensation time sent by the system circuit in the display frame F0.

In some embodiments of the present disclosure, as shown in FIG. 13, each driving element 112 may further include at least one of an interface circuit 1123, a reference voltage circuit 1124, a decoder circuit 1125, a voltage stabilizing circuit 1126 or an electrostatic protection circuit 1127. The reference voltage circuit 1124 may determine a fixed reference voltage. The electrostatic protection circuit 1127 may be coupled with an addressing signal terminal O5 and a reference voltage terminal O6 respectively, so that electrostatic protection may be performed on a power supply voltage VCC input by the addressing signal terminal O5 and a reference voltage VSS input by the reference voltage terminal O6. The voltage stabilizing circuit 1126 may be coupled with the addressing signal terminal O5, and voltage stabilizing may be performed on the power supply voltage VCC input by the addressing signal terminal O5. The decoder circuit 1125 may recognize addresses carried in driving data sent by a logic control circuit, and output a data receiving signal to the interface circuit 1123 coupled with a driving signal terminal O4 when a corresponding address is recognized. After receiving the data receiving signal, the interface circuit 1123 receives the driving data, decodes the driving data and then provide it to the processing control circuit 1122, such that the processing control circuit 1122 generates a light-emitting control signal according to the driving data. The driving elements 112 may receive the power supply voltage VCC through the addressing signal terminal O5 and input the received power supply voltage VCC to the interface circuit 1123. The interface circuit 1123 may decode the received power supply voltage and then provide it to the processing control circuit 1122 and the data driving circuit 1121, so as to supply power to the processing control circuit 1122 and the data driving circuit 1121. In addition, the interface circuit 1123 may decode the received power supply voltage and then provide it to the reference voltage circuit. The reference voltage circuit may generate a basis reference voltage according to the received power supply voltage. The driving data may be decoded through the interface circuit 1123 and then provided to the processor 11221 in the processing control circuit 1122, such that the processor 11221 generates a driving control signal and a current control signal according to the decoded driving data.

In conjunction with FIG. 3, FIG. 8 to FIG. 11 and FIG. 13 to FIG. 17, a working process of an electronic device in the embodiment of the present disclosure is described in detail below. The light-emitting period being a display sub-frame is taken as an example.

When the electronic device is started, the display frame F0 may display no any image, such as showing a black picture, and in the display frame F0, a stage t0, a stage t1 and a stage t2 are successively performed. The process of the stages t0 and t1 may be described as above, which will be repeated here. In the stage t2, reserved control instruction positions P2+P3 of 16 bits and/or reserved control instruction positions P4+P5 of 16 bits in current set information Co may carry the potential compensation times respectively corresponding to the first color light emitting device 1111, the second color light emitting device 1112 and the third color light emitting device 1113 one to one. In this way, the processor 11221 may store the received potential compensation times.

It should be noted that the above potential compensation times may be determined by testing before the electronic device leaves a factory. Exemplarily, a method for determining the potential compensation times may be: controlling each light emitting device in a display panel to show brightness of a specific gray scale (a preset gray scale, for example, may be a low gray scale), shooting the lightened display panel by a camera, so as to collect original brightness data at each position of the display panel, and dividing the original brightness of the same specific gray scale shown by each light emitting device into a plurality of intervals, wherein there is a mapping relationship between each interval and a potential compensation time. For the specific gray scale, the corresponding interval may be found according to the original brightness data corresponding to each light emitting device, so as to determine the potential compensation time corresponding to each light emitting device. For example, when the same specific gray scale is displayed, the original brightness shown by each light emitting device may be divided into eight intervals: L0-L1, L1-L2, L2-L3, L3-L4, L4-L5, L5-L6, L6-L7, and L7-L8. A brightness range of L0-L1 corresponds to a potential compensation time 0 ns, a brightness range of L1-L2 corresponds to a potential compensation time 5 ns, a brightness range of L2-L3 corresponds to a potential compensation time 10 ns, a brightness range of L3-L4 corresponds to a potential compensation time 20 ns, a brightness range of L4-L5 corresponds to a potential compensation time 40 ns, a brightness range of L5-L6 corresponds to a potential compensation time 50 ns, a brightness range of L6-L7 corresponds to a potential compensation time 60 ns, and a brightness range of L7-L8 corresponds to a potential compensation time 70 ns. If the original brightness data of the light emitting device when displaying the specific gray scale corresponds to the brightness range of L6-L7, it may be determined that the potential compensation time corresponding to the light emitting device when displaying the specific gray scale is 60 ns. Accordingly, the determined potential compensation time corresponding to each light emitting device when displaying the specific gray scale is stored, for example, stored in the system circuit 300.

An embodiment of the present disclosure further provides a display driving method, which may be performed by the above electronic device. The display driving method may include: the positive signal line and the reference voltage terminal of the driving element are controlled to form an electrical loop within a working time duration of a light-emitting period. A potential of a second terminal of a device group coupled with the driving element is adjusted before the working time duration of the light-emitting period. It should be noted that a working principle and a specific implementation of the display driving method are basically the same as those of the electronic device in the above embodiments. Therefore, the working method of the display driving method may be implemented by referring to the specific implementation of the electronic device in the above embodiments, which will not be repeated here.

Those skilled in the art will appreciate that the embodiments of the present disclosure may be provided as methods, systems, or computer program products. Therefore, the present disclosure may take the form of a full hardware embodiment, a full software embodiment, or an embodiment combining software and hardware. Besides, the present disclosure may adopt the form of a computer program product implemented on one or more computer available storage media (including but not limited to a disk memory, a CD-ROM, an optical memory and the like) containing computer available program codes.

The present disclosure is described with reference to the flow charts and/or block diagrams of the method, device (system), and computer program product according to the embodiments of the present disclosure. It should be understood that each flow and/or block in the flow chart and/or block diagram and the combination of flows and/or blocks in the flow chart and/or block diagram can be implemented by computer program instructions. These computer program instructions can be provided to processors of a general-purpose computer, a special-purpose computer, an embedded processor or other programmable data processing devices to generate a machine, so that instructions executed by processors of a computer or other programmable data processing devices generate an apparatus for implementing the functions specified in one or more flows of the flow chart and/or one or more blocks of the block diagram.

These computer program instructions can also be stored in a computer-readable memory capable of guiding a computer or other programmable data processing devices to work in a specific manner, so that instructions stored in the computer-readable memory generate a manufacturing product including an instruction apparatus, and the instruction apparatus implements the functions specified in one or more flows of the flow chart and/or one or more blocks of the block diagram.

These computer program instructions can also be loaded on a computer or other programmable data processing devices, so that a series of operation steps are executed on the computer or other programmable devices to produce computer-implemented processing, and thus, the instructions executed on the computer or other programmable devices provide steps for implementing the functions specified in one or more flows of the flow chart and/or one or more blocks of the block diagram.

Although the preferred embodiments of the present disclosure have been described, those skilled in the art can make additional changes and modifications on these embodiments once they know the basic creative concept. So the appended claims are intended to be construed to include the preferred embodiments and all changes and modifications that fall into the scope of the present disclosure.

Apparently, those skilled in the art may make various modifications and variations to the embodiments of the present disclosure without departing from the spirit and scope of the embodiments of the present disclosure. In this way, under the condition that these modifications and variations to the embodiments of the present disclosure fall within the scope of the claims of the present disclosure and their equivalent technologies, the present disclosure is also intended to include these modifications and variations.

What is claimed is:

1. An electronic device, comprising:

a plurality of device groups and a plurality of driving elements; wherein a first terminal of at least one device group of the plurality of device groups is coupled with a positive signal line, a second terminal of at least one device group of the plurality of device groups is coupled with an output terminal of any one driving element of the plurality of driving elements, and a reference voltage terminal of the driving element of the plurality of driving elements is configured to be coupled with a reference signal line; and the driving element of the plurality of driving elements is configured to: control the positive signal line and the reference voltage terminal of the driving element to form an electrical loop within a working time duration of a light-emitting period, and adjust a potential of the second terminal of the at least one device group coupled with the driving element before the working time duration of the light-emitting period;

wherein the driving element of the plurality of driving elements is further configured to control the second terminal of the device group coupled with the driving element to be on with the reference voltage terminal of the driving element for a first compensation time before the working time duration;

wherein the positive signal line comprises a first positive signal line and a second positive signal line; the device groups comprise at least two light emitting devices of different light emitting colors; wherein a light emitting device for emitting red light is connected with one of the first positive signal line and the second positive signal line, and a light emitting device for emitting two different light except for red light is connected with other one of the first positive signal line and the second positive signal line.

2. The electronic device according to claim 1, wherein the device groups comprises a red light emitting device, a blue light emitting device and a green light emitting device; wherein the blue light emitting device and the green light emitting device are connected with the first positive signal line, and the red light emitting device is connected with the second positive signal line;

wherein a width of the reference signal line is greater than a width of the first positive signal line, or a width of the reference signal line is greater than a width of the second positive signal line.

3. The electronic device according to claim 2, wherein the driving element of the plurality of driving elements is further configured to control the second terminal of the device group coupled with the driving element to be on with the reference voltage terminal of the driving element for a second compensation time within the working time duration.

4. The electronic device according to claim 3, wherein the first compensation time and the second compensation time are successively-continuous time durations.

5. The electronic device according to claim 4, wherein for the at least one device group of the plurality of device groups, the second compensation time corresponding to the at least one device group is less than the first compensation time corresponding to the at least one device group.

6. The electronic device according to claim 5, wherein for the at least one device group among the plurality of device groups, the second compensation time corresponding to the at least one device group is less than half of the first compensation time corresponding to the at least one device group.

7. The electronic device according to claim 6, wherein the at least one device group comprises a plurality of devices; and each device of the plurality of devices is provided with a first compensation time and a second compensation time corresponding to the device, and the second compensation time corresponding to each device of the plurality of devices is less than half of the first compensation time corresponding to each device of the plurality of devices.

8. The electronic device according to claim 7, wherein at least two devices of the plurality of devices respectively correspond to different first compensation times, wherein a first compensation time which is relatively larger among the different first compensation times corresponds to a second compensation time which is relatively larger.

9. The electronic device according to claim 7, wherein second compensation times corresponding to at least part of the plurality of devices are the same.

10. The electronic device according to claim 1, wherein the driving element of the plurality of driving elements is further configured to control the positive signal line to form the electrical loop at least successively through the device group coupled with the driving element, the output terminal of the driving element and the reference voltage terminal at an end moment of the first compensation time.

11. The electronic device according to claim 10, wherein the driving element of the plurality of driving elements is further configured to control the second terminal of the device group coupled with the driving element to be on with the reference voltage terminal of the driving element for a second compensation time within the working time duration.

12. The electronic device according to claim 10, wherein the driving element of the plurality of driving elements is further configured to control the second terminal of the device group coupled with the driving element to be on with the reference voltage terminal of the driving element for a potential compensation time according to the potential compensation time pre-stored corresponding to the device group coupled with the driving element, wherein the potential compensation time is the first compensation time; or the potential compensation time is a sum of the first compensation time and the second compensation time.

13. The electronic device according to claim 1, wherein the driving element of the plurality of driving elements is further configured to control the second terminal of the device group coupled with the driving element to be on with the reference voltage terminal of the driving element for a potential compensation time according to the potential compensation time pre-stored corresponding to the device group coupled with the driving element, wherein the potential compensation time is the first compensation time; or the potential compensation time is a sum of the first compensation time and the second compensation time.

14. The electronic device according to claim 13, wherein the driving element of the plurality of driving elements comprises a processing control circuit and a data driving circuit; the data driving circuit is coupled with the processing control circuit, the output terminal and the reference voltage terminal respectively;

the processing control circuit is configured to: generate a light-emitting control signal within the light-emitting period and send the light-emitting control signal to the data driving circuit; and generate a potential adjusting control signal according to the potential compensation time and send the potential adjusting control signal to the data driving circuit; and the data driving circuit is configured to: control the positive signal line to form the electrical loop successively through the device group coupled with the driving element, the output terminal of the driving element and the reference voltage terminal according to the received light-emitting control signal within the light-emitting period, and control the second terminal of the corresponding device group to be on with the reference voltage terminal according to an effective level of the received potential adjusting control signal, wherein a duration of the effective level of the potential adjusting control signal corresponding to the device group is the potential compensation time.

15. The electronic device according to claim 14, wherein the data driving circuit comprises at least one data driving sub-circuit; one data driving sub-circuit is coupled with one output terminal; and the data driving sub-circuit is configured to receive the light-emitting control signal and the potential adjusting control signal corresponding to the coupled device group, control the positive signal line to form the electrical loop successively through the device group coupled with the driving element, the output terminal of the driving element and the reference voltage terminal of the driving element in response to the light-emitting control signal, and control the second terminal of the coupled device group to be on with the reference voltage terminal in response to the potential adjusting control signal.

16. The electronic device according to claim 15, wherein the light-emitting control signal comprises a driving control signal and a current control signal;

the data driving sub-circuit comprises a modulation circuit, a constant current source circuit and a potential adjusting circuit; wherein the constant current source circuit is coupled with the processing control circuit and the modulation circuit respectively, and the modulation circuit is coupled with an corresponding output terminal; the potential adjusting circuit is coupled with the processing control circuit and an corresponding output terminal respectively;

the constant current source circuit is configured to: receive the current control signal of the corresponding device group and output a current of a constant amplitude corresponding to the current control signal according to the received current control signal;

the modulation circuit is configured to: receive the driving control signal of the corresponding device group and input a current generated by the constant current source circuit to the coupled output terminal according to the effective level of the received driving control signal, so as to control the positive signal line to form the electrical loop at least successively through the device group coupled with the driving element, the output terminal of the driving element and the reference voltage terminal of the driving element within the working time duration; and the potential adjusting circuit is configured to receive the potential adjusting control signal of the corresponding device group and control the second terminal of the coupled device group to be on with the reference voltage terminal according to the received potential adjusting control signal.

17. The electronic device according to claim 14, further comprising: a control circuit; wherein the control circuit is coupled with the plurality of driving elements respectively;

the control circuit is configured to: store the potential compensation time of the device group corresponding to each coupled driving element and send an potential compensation time of an device group corresponding to each driving element to each driving element when the electronic device is started; and each of the driving elements is configured to receive and store the potential compensation time sent by a system circuit when the electronic device is started, and clear the stored potential compensation time when the electronic device is shut down.

18. The electronic device according to claim 17, wherein a driving signal terminal of any one of the plurality of driving elements is configured to be coupled with a driving signal line;

the control circuit is further configured to be coupled with the driving signal line and store an address of each coupled driving element, and transmit driving data carrying the address of the driving element to the driving signal line; and each of the driving element is further configured to receive the driving data and generate the light-emitting control signal according to the driving data when the address, corresponding to the driving element, in the drive data is recognized.

19. The electronic device according to claim 18, wherein an addressing signal terminal of any one of the plurality of driving elements is configured to be coupled with a site selection signal line;

the control circuit is further configured to be coupled with the site selection signal line and input a power supply voltage to the site selection signal line; and each of the driving elements is further configured to receive the power supply voltage through the addressing signal terminal.

20. A display driving method, performed by the electronic device according to claim 1, wherein the electronic device comprises a plurality of device groups and a plurality of driving elements; and the display driving method comprises:

controlling a positive signal line and a reference voltage terminal to form an electrical loop within a working time duration of a light-emitting period; wherein a potential of a second terminal of a coupled device group is adjusted before the working time duration of the light-emitting period; and the second terminal of the device group coupled with the driving element is controlled to be on with the reference voltage terminal of the driving element for a first compensation time before the working time duration.

* * * * *